United States Patent
Aoki et al.

(10) Patent No.: US 12,394,893 B2
(45) Date of Patent: Aug. 19, 2025

(54) METHOD AND APPARATUS FOR CALIBRATING PHASED ARRAY ANTENNA

(71) Applicant: Samsung Electronics Co., Ltd., Suwon-si (KR)

(72) Inventors: Yuichi Aoki, Suwon-si (KR); Tuan Manh Dao, Suwon-si (KR); Daehyun Kang, Suwon-si (KR); Yonghoon Kim, Suwon-si (KR); Yongan Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 17/758,494

(22) PCT Filed: Jan. 8, 2021

(86) PCT No.: PCT/KR2021/000239
§ 371 (c)(1),
(2) Date: Jul. 7, 2022

(87) PCT Pub. No.: WO2021/141434
PCT Pub. Date: Jul. 15, 2021

(65) Prior Publication Data
US 2023/0031668 A1    Feb. 2, 2023

(30) Foreign Application Priority Data
Jan. 9, 2020    (KR) .................. 10-2020-0003036

(51) Int. Cl.
*H01Q 3/26*    (2006.01)
*H01Q 3/30*    (2006.01)

(52) U.S. Cl.
CPC ............... *H01Q 3/267* (2013.01); *H01Q 3/30* (2013.01)

(58) Field of Classification Search
CPC .................. H01Q 3/267; H01Q 3/30
See application file for complete search history.

(56) References Cited

U.S. PATENT DOCUMENTS 6,384,781 B1    5/2002    Kautz et al.
7,593,826 B2    9/2009    Weese
(Continued)

FOREIGN PATENT DOCUMENTS

KR    10-2010-0102195 A    9/2010
KR    10-2015-0076756 A    7/2015
(Continued)

OTHER PUBLICATIONS

Office Action dated Jan. 12, 2024, in connection with Korean Application No. 10-2020-0003036, 10 pages.
(Continued)

*Primary Examiner* — Vladimir Magloire
*Assistant Examiner* — Maxine McKenzie Phillips

(57) ABSTRACT

The present disclosure relates to a communication technique for merging, with an IoT technology, a 5G communication system for supporting a higher data transmission rate than a 4G system, and a system therefor. The present disclosure can be applied to intelligent services (for example, smart homes, smart buildings, smart cities, smart cars or connected cars, healthcare, digital education, retail businesses, security- and safety-related services, and the like) on the basis of a 5G communication technology and an IoT-related technology. The present disclosure discloses a method for calibration of a phased array antenna.

11 Claims, 28 Drawing Sheets

(56) References Cited

U.S. PATENT DOCUMENTS

| | | |
|---|---|---|
| 7,714,775 B2 | 5/2010 | Navarro et al. |
| 8,013,783 B2 | 9/2011 | Lomes et al. |
| 10,505,647 B2 | 12/2019 | Lee et al. |
| 2017/0310004 A1 | 10/2017 | Swirhun et al. |
| 2018/0115064 A1 | 4/2018 | Safavi-Naeini et al. |
| 2020/0228211 A1 | 7/2020 | Dao et al. |

FOREIGN PATENT DOCUMENTS

| | | |
|---|---|---|
| KR | 10-2017-0006639 A | 1/2017 |
| KR | 10-1785980 B1 | 10/2017 |
| KR | 10-2019-0021688 A | 3/2019 |

OTHER PUBLICATIONS

Supplementary European Search Report dated Dec. 23, 2022 in connection with European Patent Application No. 21 73 8722, 8 pages.
International Search Report and Written Opinion of the International Searching Authority dated Apr. 15, 2021, in connection with International Application No. PCT/KR2021/000239, 10 pages.
Office Action dated Aug. 14, 2024, in connection with Korean Application No. 10-2020-0003036, 9 pages.
Communication pursuant to Article 94(3) EPC dated Jul. 23, 2024, in connection with European Application No. 21738722.4, 7 pages.
Decision of Rejection issued Apr. 7, 2025, in connection with Korean Patent Application No. 10-2020-0003036, 7 pages.

METHOD AND APPARATUS FOR CALIBRATING PHASED ARRAY ANTENNA

CROSS-REFERENCE TO RELATED APPLICATIONS

This application is a 371 National Stage of International Application No. PCT/KR2021/000239, filed Jan. 8, 2021, which claims priority to Korean Patent Application No. 10-2020-0003036, filed Jan. 9, 2020, the disclosures of which are herein incorporated by reference in their entirety.

BACKGROUND

1. Field

The disclosure relates to signal control in a mobile communication system, and more particularly, to a method and device for calibration of a phased array antenna.

2. Description of Related Art

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

SUMMARY

The disclosure provides a method and device for calibration of a phased array antenna based on the above description.

The disclosure also provides a method and device for calibrating a plurality of radio frequency (RF) chains included in a phased array antenna.

The disclosure also provides a method and device for reducing the time required to calibrate an RF chain of a phased array antenna.

The disclosure also provides a method and device for calibrating each RF chain based on a relative phase value difference of each chain in a plurality of RF chains.

The disclosure also provides a method and device for calibrating a plurality of RF chains based on a reference signal and a known phase value.

The disclosure discloses a method for calibration of a phased array antenna. The method for calibrating a phased array antenna includes transmitting a second signal in which a plurality of first phase code sets including a phase arbitrarily designated for each of a plurality of RF chains are applied to a first signal transmitted from the plurality of RF chains; obtaining the second signal; determining a phase difference of each of the plurality of RF chains based on a plurality of second phase code sets measured corresponding to the plurality of first phase code sets from the obtained second signal; and calibrating a phase for at least some of the plurality of RF chains based on the phase difference of each of the plurality of RF chains.

The number of the plurality of first phase code sets may be generated by the number of the plurality of RF chains.

The second signal may include a plurality of third signals generated by applying each of the plurality of first phase code sets to the first signal.

Obtaining the second signal may include receiving the second signal through a coupler connected to the plurality of RF chains.

Obtaining the second signal may include receiving the second signal through an antenna in a reception mode.

Determining a phase difference of each of the plurality of RF chains based on a plurality of second phase code sets measured corresponding to the plurality of first phase code sets from the second signal may include determining a phase difference of each of the plurality of RF chains based on linear equations generated by the number of the plurality of first phase code sets or the number of the plurality of second phase code sets.

Calibrating a phase for at least some of the plurality of RF chains based on the phase difference of each of the plurality of RF chains may include determining a phase control value for each of the plurality of RF chains using a result of applying a square matrix in which the sum of each row converges to one constant to the phase difference; and applying the determined phase control value to each of the plurality of RF chains.

A square matrix in which the sum of each row converges to one constant may be determined based on the following equation, $$H_{P1} = 1 \quad [\text{Equation}]$$
$$H_{p2n} = \begin{bmatrix} H_{Pn} & H_{Pn} \cdot e^{j\frac{2}{\pi}} \\ H_{Pn} \cdot e^{j\frac{2}{\pi}} & H_{Pn} \end{bmatrix}$$

where 2n may be determined by the number of RF chains included in the phased array antenna.

Calibrating a phase for at least some of the plurality of RF chains based on the phase difference of each of the plurality of RF chains may include determining a phase control value in which a gain of the phased array antenna is maximized for each of the plurality of RF chains; and applying the determined phase control value to each of the plurality of RF chains.

The disclosure discloses a device for calibration of a phased array antenna. The device for calibrating a phased array antenna includes a plurality of RF chains constituting the phased array antenna and transmitting signals; and a controller configured to generate a second signal in which a plurality of first phase code sets including a phase arbitrarily designated for each of the plurality of RF chains are applied to a first signal transmitted from the plurality of RF chains, to process to transmit the generated second signal through the plurality of RF chains, to obtain the transmitted second signal, to determine a phase difference of each of the plurality of RF chains based on a plurality of second phase code sets measured corresponding to the plurality of first phase code sets from the obtained second signal, and to calibrate a phase for at least some of the plurality of RF chains based on the phase difference of each of the plurality of RF chains.

The controller may be configured to generate the number of the plurality of first phase code sets by the number of the plurality of RF chains.

The controller may be configured to generate the second signal by including a plurality of third signals generated by applying each of the plurality of first phase code sets to the first signal.

The controller may be configured to receive the second signal through a coupler connected to the plurality of RF chains.

The controller may be configured to receive the second signal through an antenna in a reception mode.

The controller may be configured to determine a phase difference of each of the plurality of RF chains based on linear equations generated by the number of the plurality of first phase code sets or the number of the plurality of second phase code sets.

The controller may be configured to determine a phase control value for each of the plurality of RF chains using a result of applying a square matrix in which the sum of each row converges to a constant to the phase difference, and to apply the determined phase control value to each of the plurality of RF chains.

A square matrix in which the sum of each row converges to one constant may be determined based on the following equation, $$H_{P1} = 1 \quad [\text{Equation}]$$
$$H_{p2n} = \begin{bmatrix} H_{Pn} & H_{Pn} \cdot e^{j\frac{2}{\pi}} \\ H_{Pn} \cdot e^{j\frac{2}{\pi}} & H_{Pn} \end{bmatrix}$$

where 2n may be determined by the number of RF chains included in the phased array antenna.

The controller may be configured to determine a phase control value in which a gain of the phased array antenna is maximized for each of the plurality of RF chains, and to apply the determined phase control value to each of the plurality of RF chains.

The disclosure discloses a method for calibration of a phased array antenna. The method includes transmitting a second signal in which a plurality of first phase code sets including a phase arbitrarily designated for each of a plurality of RF chains are applied to a first signal transmitted from the plurality of RF chains; obtaining the second signal; determining a distortion difference of each of the plurality of RF chains based on a plurality of second phase code sets measured corresponding to the plurality of first phase code sets from the obtained second signal; and calibrating a gain of at least some of the plurality of RF chains based on the distortion difference of each of the plurality of RF chains.

In a method and device according to various embodiments of the disclosure, by simultaneously calibrating a plurality of radio frequency (RF) chains of a phased array antenna, it is possible to reduce the time required for calibration, and to contribute to mass production of the phased array antenna.

DETAILED DESCRIPTION

Figure 1:
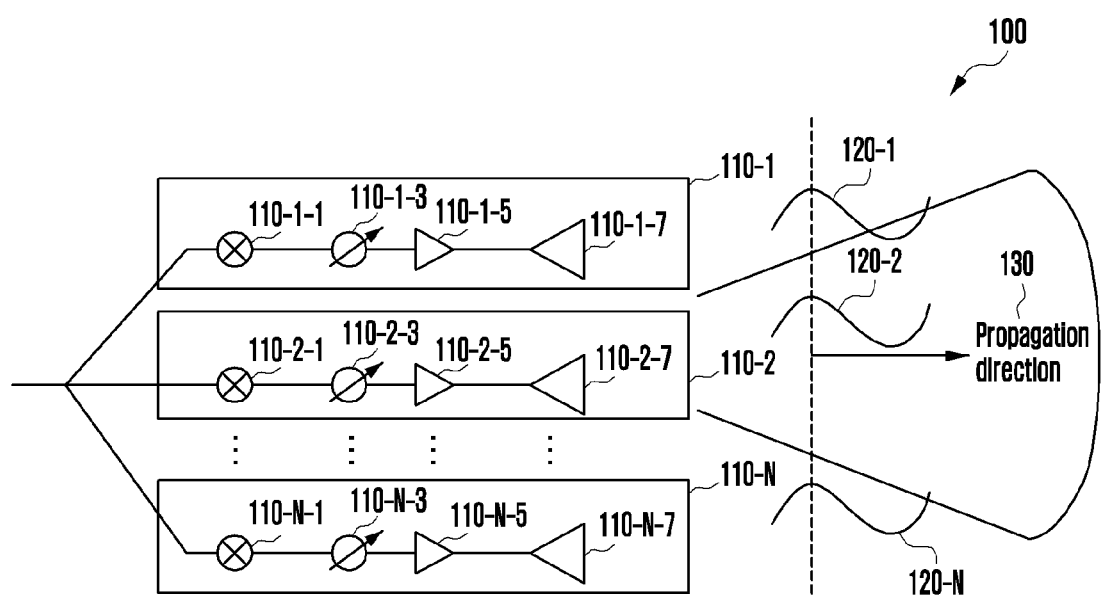
FIG. 1 is a block diagram illustrating a phased array antenna according to an embodiment of the disclosure.

In describing embodiments of the disclosure, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only these embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

In this case, it will be understood that each block of flowcharts and combinations of the flowcharts may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the flowchart block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the flowchart block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the flowchart block(s).

Further, each block may represent a module, a segment, or a portion of a code including one or more executable instructions for executing specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, the term '-unit' used in this embodiment means software or hardware components such as FPGA or ASIC, and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card. Further, in an embodiment, '-unit' may include one or more processors.

Hereinafter, for convenience of description, the disclosure uses terms and names defined in standards for 5G, new radio (NR), and long term evolution (LTE) systems. However, the disclosure is not limited by the terms and names, and may be equally applied to systems conforming to other standards.

Terms indicating signals used in the following description, terms indicating components of a device, and the like are exemplified for convenience of description. Accordingly, the disclosure is not limited to the terms described below, and other terms having equivalent technical meanings may be used.

Hereinafter, the disclosure relates to a device and method for calibrating a phased array antenna. Specifically, the disclosure describes technology for faster calibrating a target RF chain using a phase difference between a phase of a reference signal transmitted from a reference radio frequency (RF) chain and a phase of a signal transmitted from the target RF chain.

Spatial multiplexing in wireless communication is based on multiple-input and multiple-output (MIMO) technology in which multiple data streams are simultaneously transmitted from multiple antennas using the same time/same frequency resource. A 5G network is introducing new MIMO technology called massive MIMO (mMIMO) that enables beamforming of each data stream using a phased array antenna in a millimeter-wave (mmWave) band.

For example, a short wavelength of mmWave may allocate a large number of antenna elements in a small area, and a phased array antenna of mMIMO may form a very narrow range of directional beams that focus on specific user devices radially aligned at a specific antenna element.

A beam direction may be adjusted in real time by electrically changing a phase of the phased array antenna, and as a result, beamforming may improve spectral efficiency per cell, reduce interference to other users, and improve a signal quality in cell energy.

Because short wavelengths are very sensitive to phase offsets due to unequal line lengths, random delay deviations in components, or imbalances due to production asymmetry, a phased array system including a phased array antenna may require calibration of the phased array antenna for obtaining an optimal array performance.

Accordingly, there is a need for a method and device capable of improving a performance of a phased array antenna while minimizing a production cost without degrading a performance, and as an embodiment, calibration using loop back may be provided.

FIG. 1 is a block diagram illustrating a phased array antenna 100 according to an embodiment of the disclosure.

With reference to FIG. 1, a phased array antenna 100 includes a plurality of radio frequency (RF) chains 110-1 to 110-N. Hereinafter, for convenience of description, components of the RF chain 110-1 and a function of each component are described, but this is for convenience of description, and each component of other RF chains (e.g., RF chains 110-2 to 110-N) may also perform the same function as or a similar function to each component of the RF chain 110-1.

A mixer 110-1-1 may convert a center frequency of an input signal and output a signal having the converted center frequency. For example, the mixer 110-1-1 may convert an intermediate frequency (IF) signal into an RF signal or convert an RF signal into an IF signal. Here, a frequency of the RF signal may be expressed as the sum of a frequency of the IF signal and a frequency of a local oscillator (LO) signal, and a frequency of the IF signal may be expressed as the result of subtracting a frequency of the LO signal from a frequency of the RF signal. To this end, the mixer 110-1-1 is not illustrated in FIG. 1, but may be connected to the LO.

A phase shifter 110-1-3 may convert a phase of an input signal and output a signal having the converted phase. For example, the phase shifter 110-1-3 may delay or advance a phase of the input signal. One phase value of a plurality of phase values may be configured to the phase shifter 110-1-3. Each of the plurality of phase values may correspond to one of angles ranging from 0 degrees to 360 degrees, and different phase values may correspond to different angles. Accordingly, when the phase shifter 110-1-3 receives an external control signal for changing a phase value currently configured thereto, the phase shifter 110-1-3 may convert a phase of an input signal by a phase or an angle corresponding to the phase value change.

An amplifier 110-1-5 may amplify the input signal. The amplifier 110-1-5 may provide the amplified signal to a radiator 110-1-7. According to an embodiment, the amplifier 110-1-5 may be configured as a power amplifier.

The radiator 110-1-7 may convert an input electrical signal into an electromagnetic wave and radiate the electromagnetic wave to a free space. The radiator may be provided as an antenna for signal transmission or reception.

A signal 120-1 may be transmitted from the RF chain 110-1 through the mixer 110-1-1, the phase shifter 110-1-3, the amplifier 110-1-5, and the radiator 110-1-7 or may be received by the RF chain 110-1 through the radiator 110-1-7, the amplifier 110-1-5, the phase shifter 110-1-3, and the mixer 110-1-1. Similarly, a signal 120-2 may be transmitted from an RF chain 110-2 or may be received by the RF chain 110-2, and a signal 120-N may be transmitted from an RF chain 110-N or may be received by the RF chain 110-N.

Here, when phases of the signals 120-1 to 120-N simultaneously transmitted by the plurality of RF chains 110-1 to 110-N are the same, the signals 120-1 to 120-N may form a plane wave as a whole and be propagated in a specific direction. That is, the signals 120-1 to 120-N propagated in a specific direction may form a beam (e.g., a beam 130) in a specific direction. When phase values configured to each of the plurality of phase shifters 110-1-3 to 110-N-3 are changed by the same value in a state in which phases of the signals 120-1 to 120-N are the same, the signals 120-1 to 120-N may still form a plane wave as a whole, and be propagated in a direction changed by an angle corresponding to a phase value change in a specific direction.

Accordingly, when phase values are configured to each of the plurality of phase shifters 110-1-3 to 110-N-3 so that phases of the signals 120-1 to 120-N are the same, a device using the phased array antenna 100 may input the same phase value change corresponding to a specific angle change to the plurality of phase shifters 110-1-3 to 110-N-3 to form a beam in a desired direction or to steer a beam.

In other words, it is possible to maintain the plane wave as a whole by controlling each of the plurality of phase shifters 110-1-3 to 110-N-3 so that phases of the signals 120-1 to 120-N are the same, so that beamforming is possible. For this, initial phases of the signals 120-1 to 120-N need to be configured to be the same, and when there is a difference in initial phase values of each of the plurality of phase shifters 110-1-3 to 110-N-3, it is required to control this.

According to various embodiments of the disclosure, calibration means configuring phase values of the phase shifters 110-1-3 to 110-N-3 so that initial phases of the signals 120-1 to 120-N are the same. Calibration may be performed for each of the RF chains 110-1 to 110-N. For example, when calibration is performed in the RF chain 110-1, a phase value may be configured to the phase shifter 110-1-3 included in the RF chain 110-1 so that an initial phase of the signal 120-1 is the same as an initial phase of a signal transmitted by a reference RF chain.

Here, the reference RF chain means an RF chain having a phase value as a reference for calibration of at least one other RF chain. The reference RF chain may be one of the plurality of RF chains 110-1 to 110-N. For example, when the reference RF chain is 110-1, calibration may be performed in the remaining RF chains 110-2 to 110-N. In this case, the remaining RF chains 110-2 to 110-N in which calibration is to be performed may be referred to as a 'calibration target RF chain' or simply a 'target RF chain'.

When calibration is performed in any RF chain, the RF chain may serve as a reference RF chain for calibration of other RF chains. In other words, the reference RF chain may be changed while calibrating a plurality of RF chains. For example, when the RF chain 110-1 is used as the reference RF chain for calibration of the RF chain 110-2, the calibrated RF chain 110-2 may be used as the reference RF chain for calibration of the RF chain 110-3.

Further, the reference RF chain is not specified, and calibration may be performed in all of the plurality of RF chains 110-1 to 110-N included in the phased array antenna 100.

Calibration of the plurality of RF chains 110-1 to 110-N included in the phased array antenna 100 may be performed by a calibration device. In other words, the calibration device may simultaneously or at least partially calibrate the plurality of RF chains 110-1 to 110-N included in the phased array antenna 100.

According to various embodiments of the disclosure, calibrating each of the plurality of RF chains 110-1 to 110-N included in the phased array antenna 100 may be understood as calibrating the phased array antenna 100, and a phased array antenna in which calibration is to be performed may be referred to as a 'target phased array antenna'.

A configuration of the calibration device (e.g., a calibration device 200) for calibrating the phased array antenna 100 will be described in more detail with reference to FIG. 2A.

Figure 2A:
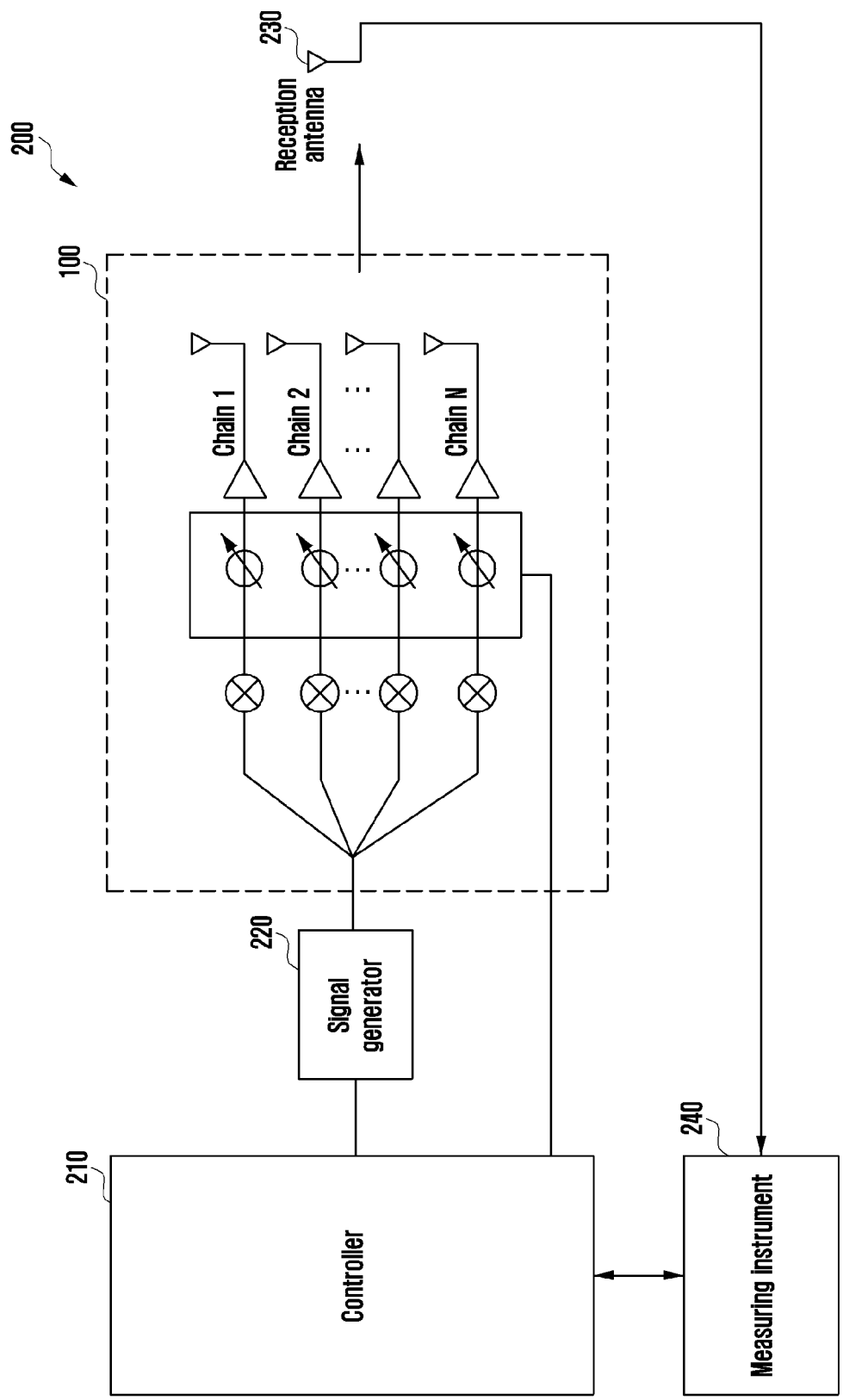
FIGS. 2A and 2B are block diagrams illustrating a constitution of a calibration device according to an embodiment of the disclosure.

FIG. 2A is a block diagram illustrating a constitution of a calibration device according to an embodiment of the disclosure.

Figure 2B:
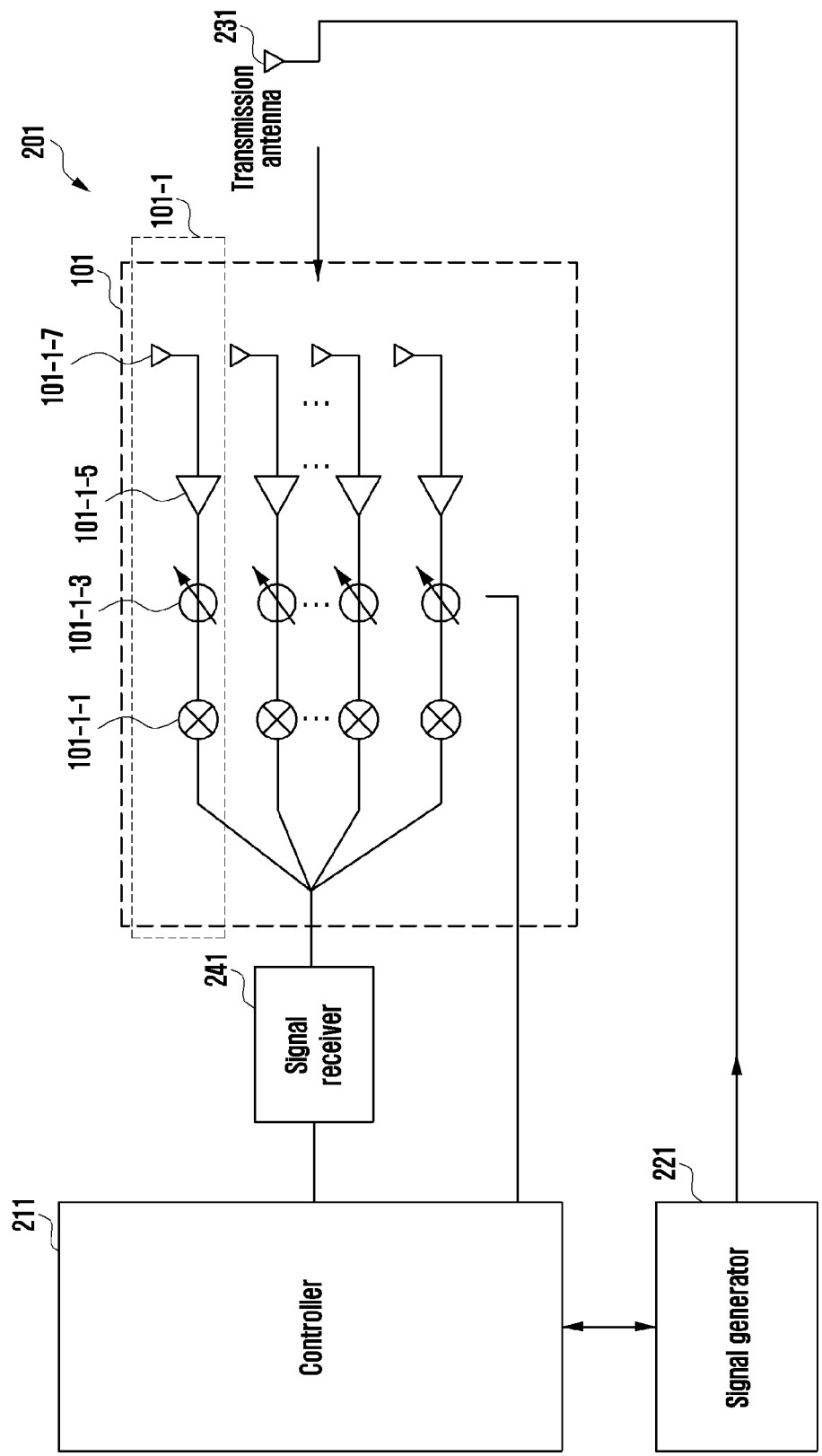

In FIGS. 2A and 2B, for convenience of description, it is assumed that calibration devices 200 and 201 calibrate phased array antennas 100 and 101, but this is an example, and the calibration devices 200 and 201 may calibrate any phased array antenna included therein or connected thereto.

With reference to FIG. 2A, the calibration device 200 includes a controller 210, a signal generator 220, a reception antenna 230, and a measuring instrument 240. Here, the calibration device 200 may include the phased array antenna 100.

The controller 210 controls overall operations of the calibration device 200. For example, the controller 210 may control the signal generator 220 to generate an initial input signal. In order to perform the above-described control operation, the controller 210 may include at least one processor or a microprocessor or may be a part of the processor.

According to various embodiments, the controller 210 may configure a phase value to each of the phase shifters 110-1-1 to 110-N-1 and change the configured phase value. Configuring a phase value to the phase shifters 110-1-1 to 110-N-1 may be understood as configuring a phase value to the RF chains 110-1 to 110-N. For example, configuring a phase value to the phase shifter 110-1-1 may be understood as configuring a phase value to the RF chain 110-1 including the phase shifter 110-1-1. Accordingly, a phase value configured to each of the phase shifters 110-1-1 to 110-N-1 may be understood as a phase value of each of the RF chains 110-1 to 110-N. The controller 210 may configure a phase value of each of the RF chains 110-1 to 110-N to control each of the RF chains 110-1 to 110-N to transmit a signal whose initial phase is corrected corresponding to the configured phase value.

According to various embodiments, the controller 210 may control an on/off state of each of the RF chains 110-1 to 110-N. In other words, the controller 210 may turn on or off each of the RF chains 110-1 to 110-N. To this end, the controller 210 may block or maintain a supply voltage of each of the RF chains 110-1 to 110-N. Further, the controller 210 may transmit a control signal for controlling an on/off state to each of the RF chains 110-1 to 110-N.

According to various embodiments, the controller 210 may measure power of a signal transmitted from the phased array antenna 100. Specifically, the controller 210 may measure power of a signal transmitted from each RF chain in the phased array antenna 100 and measure power of a combined signal of signals transmitted from two or more RF chains.

The signal generator 220 may generate an initial input signal for calibrating the phased array antenna 100. The signal generator 220 may provide the generated initial input signal to the phased array antenna 100 so that a signal is transmitted from the RF chains in an on state in the phased array antenna 100. For example, the signal generator 220 may generate a signal for calibrating phases of RF chains of the phased array antenna under the control of the controller 210.

According to various embodiments, the signal generator 220 may be configured as a part of a transmitter that generates and transmits a signal. Further, the signal generator 220 illustrates an operation performed in an embodiment in which the phased array antenna 100 transmits a signal, and when the phased array antenna serves as a reception antenna for receiving a signal, the signal generator 220 may be configured as a receiver. According to an embodiment, the signal generator 220 may be configured as a transceiver. In this case, the phased array antenna 101 may be configured to selectively operate in a transmission mode or a reception mode.

The reception antenna 230 may receive a signal transmitted from a radiator of the phased array antenna 100.

The measuring instrument 240 may analyze a signal received through the reception antenna 230. In order to perform the above-described control operation, the measuring instrument 240 may include at least one processor or microprocessor or may be a part of a processor.

The measuring instrument 240 may communicate with the controller 210 by wire or wirelessly. Further, the measuring instrument 240 may be connected with the controller 210 or may be included in a part of the controller 210.

The measuring instrument 240 may receive a signal through the reception antenna 230. For example, the measuring instrument 240 may receive a signal transmitted from a target phased array antenna (e.g., the phased array antenna 100) and analyze a spectrum of the received signal.

According to various embodiments, the measuring instrument 240 may measure power of a signal transmitted from the phased array antenna 100. Specifically, the measuring instrument 240 may receive a signal transmitted from each RF chain in the phased array antenna 100 through the reception antenna 230 and measure power of the received signal. In this case, the measuring instrument 240 may measure power of a combined signal of signals transmitted from two or more RF chains.

According to an embodiment, in calibrating the RF chains 110-1 to 110-N, the calibration device 200 may determine a reference phase value and calibrate the plurality of RF chains using the reference phase value. For example, the calibration device 200 may transmit a signal (hereinafter, a test signal) while changing a phase values of the plurality of RF chains, and the measuring instrument 240 that has received a test signal through the reception antenna 230 may determine a phase difference of a plurality of RF chains using the received test signal. According to an embodiment, the measuring instrument 240 may determine a phase difference (phase shift) of the RF chains based on phase code sets included in the received test signal.

The measuring instrument 240 may determine a phase control value for calibrating a plurality of RF chains based on a reference phase value and a phase difference determined for each of the plurality of RF chains.

According to various embodiments, the calibration device 200 may select a reference RF chain among the RF chains 110-1 to 110-N, and calibrate the plurality of RF chains using the reference RF chain. For example, the calibration device 200 may transmit a test signal while changing phase values of the plurality of RF chains, and the measuring instrument 240 that has received a test signal through the reception antenna 230 may determine a phase difference between the plurality of RF chains using the received test signal. According to an embodiment, the measuring instrument 240 may determine a phase difference of the RF chains based on the phase code sets included in the received test signal.

The measuring instrument 240 may determine one of the plurality of RF chains as a reference RF chain and determine a phase control value for calibrating the remaining RF chains according to the phase of the reference RF chain.

In determining a phase control value for at least one of the plurality of RF chains, the measuring instrument 240 may determine a phase control value for a signal of each of the plurality of RF chains such that a gain of a combined signal is maximized.

According to various embodiments, the measuring instrument 240 may be configured as a signal analyzer that analyzes a signal received through the reception antenna 230.

According to an embodiment, if a phase configured for each of the plurality of RF chains of a transmitted test signal and a phase identified for each of RF chains of a received test signal are the same, the gain may be maximized.

The calibration device 200 may determine a phase control value such that a gain in a phase of each of the plurality of RF chains identified from the received test signal is maximized compared to a phase of each of the plurality of RF chains configured upon transmitting.

According to various embodiments, the calibration device 200 may determine a phase control value of each of the RF chains so that a gain of a phased array antenna including the RF chains is maximized.

According to various embodiments, calibration of the phased array antenna 100 is not limited to determining a phase control value for controlling so that a phase-to-gain of each of the plurality of RF chains configured upon transmitting a test signal is maximized, but may be applied to calibration by configuring various reference values, as described above.

Various embodiments of the disclosure propose a device and method for reducing the time required for a plurality of RF chains, and enabling mass production of a phased array antenna in order to calibrate the phased array antenna, which will be described in more detail below.

As described above, FIG. 2A illustrates an operation of the phased array antenna 100 in a transmission mode in the calibration device. According to various embodiments, the calibration device may perform calibration in a reception mode of the phased array antenna, which will be described with reference to FIG. 2B.

FIG. 2B is a block diagram illustrating a configuration of a calibration device according to an embodiment of the disclosure.

In FIG. 2B, for convenience of description, the calibration device 201 may include the same components as or similar components to those of the calibration device of FIG. 2A. According to an embodiment, the calibration device 201 includes a controller 211, a signal generator 221, a transmission antenna 231, and a signal receiver 241. Here, the calibration device 200 may include a phased array antenna 101.

In this case, the phased array antenna 101 may operate in a reception mode. According to an embodiment, a plurality of RF chains included in the phased array antenna 101 may be configured to operate in a reception mode. For example, the RF chain 101-1 included in the phased array antenna 101 operating in a reception mode may include a mixer 101-1-1, a phase shifter 101-1-3, an amplifier 101-1-5, and a radiator 101-1-7.

The signal generator 221 may generate a test signal for calibrating the phased array antenna 101 that receives a signal. The signal generator 221 may transmit the generated test signal through the transmission antenna 231, and the controller 211 may process to receive a signal from the phased array antenna 101 through RF chains in an on state. For example, the signal generator 221 may generate a specific signal to calibrate a phase of RF chains of the phased array antenna.

According to various embodiments, the signal generator 221 may be configured as a part of a transmitter that generates and transmits a signal. Further, the signal generator 221 illustrates an operation performed in an embodiment in which the phased array antenna 101 receives a signal, and when the phased array antenna serves as a transmission antenna for transmitting a signal, the signal generator 221 may be configured as a transmitter. According to an embodiment, the signal generator 220 may be configured as a transceiver. In this case, the phased array antenna 101 may be configured to selectively operate in a transmission mode or a reception mode.

The transmission antenna 231 may transmit a signal (e.g., test signal) generated by the signal generator 221. The test signal transmitted through the transmission antenna 231 may be received through the phased array antenna 101. According to an embodiment, the test signal transmitted through the transmission antenna 231 may be received by a radiator configured in each of a plurality of RF chains of the phased array antenna 101, and be transmitted to the signal receiver 241 through an amplifier, a phase shifter, and a mixer configured in each of the plurality of RF chains. According to an embodiment, an operation of receiving the test signal through the plurality of RF chains constituting the phased array antenna 101 and transmitting the test signal to the signal receiver 241 may be described using the RF chain 101-1, which is one of the plurality of RF chains.

The radiator 101-1-7 may receive a test signal in the form of an electromagnetic wave in a free space and output the test signal as an electrical signal. The radiator may be provided as an antenna for signal transmission or reception.

The amplifier 101-1-5 may amplify an input signal. The amplifier 101-1-5 may provide the amplified signal to the phase shifter 101-1-3. According to an embodiment, the amplifier 101-1-5 may be configured as a low-noise amplifier.

The phase shifter 101-1-3 may convert a phase of an input signal and output a signal having the converted phase. For example, the phase shifter 101-1-3 may delay or advance the phase of the input signal. One phase value of a plurality of phase values may be configured to the phase shifter 101-1-3. Each of the plurality of phase values may correspond to one of angles ranging from 0 degrees to 360 degrees, and different phase values may correspond to different angles. Accordingly, when the phase shifter 101-1-3 receives an external control signal for changing the phase value currently configured thereto, the phase shifter 101-1-3 may convert the phase of the input signal by an angle or a phase corresponding to the phase value change.

The mixer 101-1-1 may convert a center frequency of an input signal and output a signal having the converted center frequency. For example, the mixer 101-1-1 may convert an intermediate frequency (IF) signal into an RF signal or convert an RF signal into an IF signal. Here, the frequency of the RF signal may be expressed as the sum of a frequency of the IF signal and a frequency of a local oscillator (LO) signal, and the frequency of the IF signal may be expressed as the result of subtracting the frequency of the LO signal from the frequency of the RF signal. To this end, although not illustrated in FIG. 1, the mixer 101-1-1 may be connected to the LO.

The signal receiver 241 may receive a test signal from mixers included in each of a plurality of RF chains of the phased array antenna 101. The signal receiver 241 may transmit test signals transmitted from each of the plurality of chains to the controller 211.

The controller 211 may analyze a signal received through the signal receiver 241. In order to perform the above-described control operation, the controller 211 may include at least one processor or microprocessor or may be a part of the processor.

The controller 211 may communicate with the signal generator 221 by wire or wirelessly. In this case, the test signal received by the signal receiver 241 may be a signal generated by the signal generator 221 by the number of times determined under the control of the controller 211 and transmitted through the transmission antenna 231.

For example, the controller 211 may request the signal generator 221 to generate as many test signals as the number of RF chains for calibration in the phased array antenna 101.

The controller 211 may receive, from the signal receiver 241, the number of test signals requested through the controller 211 and transmitted to the signal receiver 241 from each of a plurality of RF chains included in the phased array antenna 101.

In this case, each test signal received from the signal receiver 241 may be a signal to which an arbitrary phase determined for each signal by the controller 211 is applied through a phase shifter.

For example, the controller 211 may receive a test signal while changing phase values of the plurality of RF chains, and determine a phase difference between the plurality of RF chains configured in the phased array antenna 101 using the received test signal. According to an embodiment, the controller 211 may determine a phase difference (phase shift) of the RF chains based on phase sets identified in the received test signal.

The controller 211 may determine a phase control value for calibrating a plurality of RF chains based on a reference phase value and a phase difference determined for each of the plurality of RF chains.

An operation of obtaining phase sets from test signals received by the controller 211 and determining a phase difference and/or a phase control value of the RF chains based on the phase sets may be performed by applying equations to be described later in FIG. 6.

According to an embodiment, the controller 211 may calculate a phase difference (phase shift) generated in each of the plurality of RF chains included in the phased array antenna 101 with a method of applying an operation in which HR·AR is determined as a constant value CR in Equation 10 to HR·AR. The controller 211 may determine a phase control value of each of the RF chains so that the obtained gain of the phased array antenna is maximized.

Figure 3:
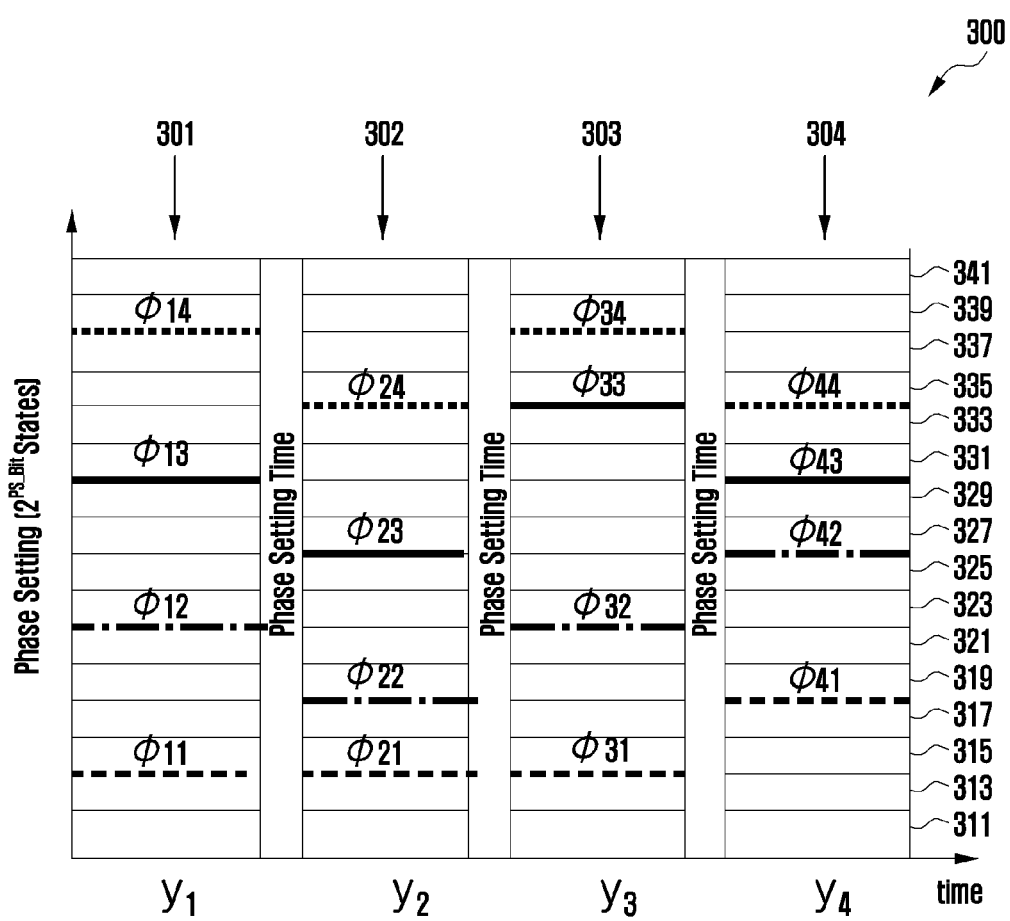
FIG. 3 is a graph illustrating a constitution example of a phase configuration and a test signal of a plurality of RF chains in a calibration device according to an embodiment of the disclosure.

FIG. 3 is a graph illustrating a configuration example of a test signal 300 and a phase configuration of a plurality of RF chains in a calibration device according to an embodiment of the disclosure.

In RF chains constituting the phased array antenna, in a phase configuration process, a variation between the configured phase and the output may occur due to a structural performance difference or an error, or the like. By temporarily or permanently pre-adjusting phase values of RF chains in which variation occurs in a signal transmission step, a phase variation problem with the transmitted signal can be improved.

According to an embodiment of the disclosure, in a method of performing calibration of a plurality of RF chains in a phased array antenna, a method and device for simultaneously performing calibration for a plurality of RF chains are invented.

For example, the calibration device 200 may transmit a test signal while changing phase values of the plurality of RF chains, as described above. In this case, as a phase value for each of the plurality of RF chains configured to the test signal, a known phase value is applied, and a phase shift of each of the plurality of RF chains may be identified based on the phase value for each of the plurality of RF chains of the test signal identified by the measuring instrument 240. The measuring instrument 240 may determine a phase control value for calibration of the phased array antenna 100 based on a phase shift of each of the plurality of identified RF chains.

With reference to FIG. 3, in performing calibration on four RF chains in a 4-way phased array antenna, a constitution of a test signal and configuration of a phase for each of the RF chains may be described. Here, a phase for the four RF chains may be configured among known 16 phases (e.g., a first phase 311 to a 16th phase 341) in a 4-way phased array antenna, and each phase interval may be configured to 22.5°.

As described above, in order to determine a phase control value for each of four RF chains, four linear equations are required; thus, the calibration device 200 may change or maintain phase values of the four RF chains and transmit signals four times to determine a phase difference and a control phase value of the four RF chains.

Accordingly, when transmitting a test signal, the controller 210 of the calibration device 200 for calibrating phases of the four RF chains determines a known arbitrary phase for each of the four RF chains to configure a phase code set. For example, the controller 210 may configure a first phase code set 301 to apply a third phase 315 to Φ11 (a first RF chain of a first transmitting signal y1) included in the test signal, a seventh phase 323 to Φ12 (a second RF chain of the first transmitting signal y1), an eleventh phase 331 to Φ13 (a third RF chain of the first transmitting signal y1), and a fifteenth phase 339 to Φ14 (a fourth RF chain of the first transmitting signal y1). The controller 210 may sequentially perform an operation of constituting such a phase code set as in a second phase code set 302, a third phase code set 303, and a fourth phase code set 304 to generate a second transmitting signal y2, a third transmitting signal y3, and a fourth transmitting signal y4. The controller 210 may sequentially transmit the generated first transmitting signal y1, second transmitting signal y2, third transmitting signal y3, and fourth transmitting signal y4 to configure a test signal so as to transmit total four times of transmitting signals to which different phase code sets are applied.

According to an embodiment, an operation of applying the first phase code set 301 to the fourth phase code set 304 to the initial input signal may be described as an operation of performing a phase shift.

Further, each phase code set may be predetermined in a state in which phases of the RF chains are combined to satisfy a specific condition for the phased array antenna. According to an embodiment, each phase code set may be determined by combining phases of the RF chains so that a gain of the phased array antenna is maximized.

According to various embodiments, because calculation of 16 linear equations is required when calibrating a 16-way phased array antenna, 16 phase code sets for 16 transmitting signals may be constituted corresponding to 16 RF chains, and a test signal may be constituted to transmit each of 16 phase code sets applied to the initial input signal.

According to various embodiments, a test signal transmission method in the 4-way phased array antenna or a test signal transmission method in the 16-way phased array antenna according to the above-described embodiments may be applied to test signal transmission of a large-scale phased array antenna exceeding 16-way.

The measuring instrument 240 may receive information on the generated test signal from the controller 210. According to an embodiment, the controller 210 may generate information on the number of RF chains for calibration related to generation of a test signal, a phase value configured to each RF chain, a phase code set including phase values of RF chains configured to each transmitting signal, and a test signal including at least a portion of an initial input signal. The measuring instrument 240 may receive information on the test signal from the controller 210. In this case, the measuring instrument 240 may receive information on a test signal from the controller 210 through wired or wireless communication or identify information on a test signal included in a test signal received through the antenna 230.

The measuring instrument 240 may receive a test signal transmitted from the phased array antenna 100 through the reception antenna 230 and determine a linear equation using the received test signal.

According to an embodiment, an initial input signal x of the test signal is a complex signal and may be expressed as follows, including the magnitude and phase of the signal.

$$x = x_I + j x_q \quad \text{[Equation 1]}$$

By applying the measured phase value for each of four RF chains and a variable a for a phase shift in the received test signal, the measuring instrument 240 may determine four linear equations using the transmitted test signal y and the received test signal as follows.

$$y_1 = a_1 \exp(j\phi_{11})x + a_2 \exp(j\phi_{12})x + a_3 \exp(j\phi_{13})x + a_4 \exp(j\phi_{14})x \quad \text{[Equation 2]}$$

$$y_2 = a_1 \exp(j\phi_{21})x + a_2 \exp(j\phi_{22})x + a_3 \exp(j\phi_{23})x + a_4 \exp(j\phi_{24})x \quad \text{[Equation 3]}$$

$$y_3 = a_1 \exp(j\phi_{31})x + a_2 \exp(j\phi_{32})x + a_3 \exp(j\phi_{33})x + a_4 \exp(j\phi_4)x \quad \text{[Equation 4]}$$

$$y_4 = a_1 \exp(j\phi_{41})x + a_2 \exp(j\phi_{42})x + a_3 \exp(j\phi_{43})x + a_4 \exp(j\phi_{44})x \quad \text{[Equation 5]}$$

Further, Equations 2 to 5 may be arranged as a function as follows.

$$Y = A \cdot M \to A + Y \cdot M^{-1} \quad \text{[Equation 6]}$$

where $$Y = [y_1 \ y_2 \ y_3 \ y_4] \quad \text{[Equation 7]}$$

$$A = [a_1 \ a_2 \ a_3 \ a_4] \quad \text{[Equation 8]}$$

$$M = xH = x \begin{bmatrix} \exp(j\phi_{11}) & \exp(j\phi_{12}) & \exp(j\phi_{13}) & \exp(j\phi_{14}) \\ \exp(j\phi_{21}) & \exp(j\phi_{22}) & \exp(j\phi_{23}) & \exp(j\phi_{24}) \\ \exp(j\phi_{31}) & \exp(j\phi_{32}) & \exp(j\phi_{33}) & \exp(j\phi_{34}) \\ \exp(j\phi_{41}) & \exp(j\phi_{42}) & \exp(j\phi_{43}) & \exp(j\phi_{44}) \end{bmatrix} \quad \text{[Equation 9]}$$

The measuring instrument 240 determines a variable A for a phase shift with an initial phase for each of four RF chains based on a function Y for the transmitted test signal y and a function M for the received test signal, thereby determining a phase difference of the initial phase applied to each of the four RF chains.

According to an embodiment, a phase difference of the initial phase applied to each of the RF chains may be determined as a variable value for a phase code set identified in the received test signal and a phase shift of each of the phases included in the phase code set.

The measuring instrument 240 may determine a phase control value for calibration of at least one of four RF chains based on the phase difference of each of four RF chains. The measuring instrument 240 may transmit the determined phase control value to the controller 210.

The controller 210 may control a phase of the RF chain constituting the phased array antenna 100 based on the phase control value received from the measuring instrument 240. According to an embodiment, the controller 210 may take and apply a reciprocal number of the phase control value when applying the phase control value to the phase shifter of the RF chain.

Figure 4:
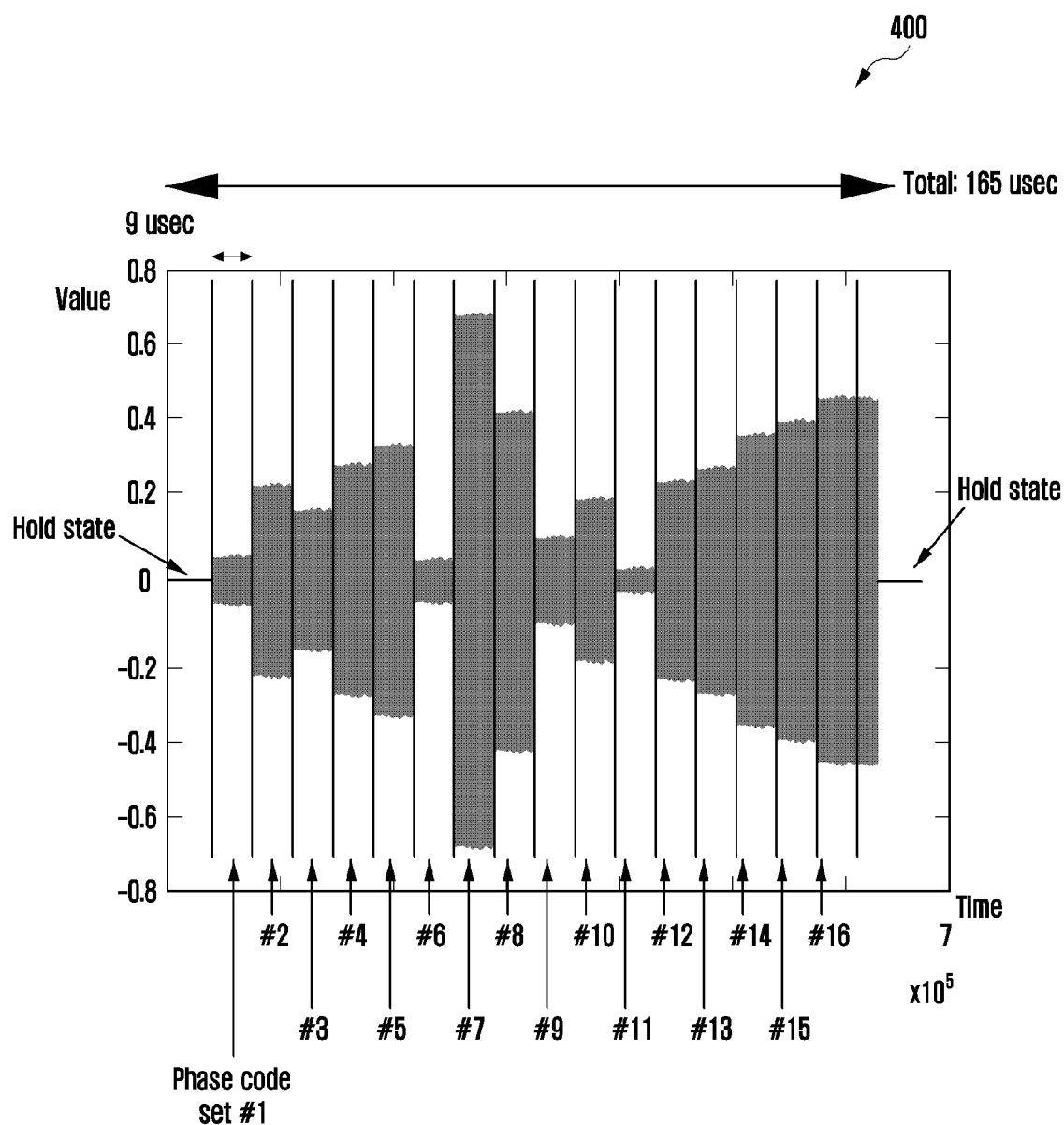
FIG. 4 is a graph illustrating power of a test signal received by a calibration device according to an embodiment of the disclosure.

FIG. 4 is a graph 400 illustrating power of a test signal received by a calibration device according to an embodiment of the disclosure.

According to an embodiment, the measuring instrument 240 may receive a test signal transmitted by the phased array antenna 100 through the reception antenna 230, and identify time-power values for a plurality of transmitting signals included in the test signal.

FIG. 4 illustrates measured power of one transmitting signal among test signals transmitted from a 16-way phased array antenna. Here, a hold state indicates the start and end of the test signal, and as power of the phase code set increases, it may be determined that an antenna performance for each of the plurality of RF chains in the phase of the corresponding phase code set is excellent.

According to an embodiment, the measuring instrument 240 may determine a phase control value based on a phase code set measured as having the greatest power. For example, the measuring instrument 240 may determine a phase control value for each of the plurality of RF chains based on a seventh phase code set identified to have the greatest power.

The measuring instrument 240 may transmit the determined phase control value to the controller 210.

By applying the phase control value received from the measuring instrument 240 to the phase shifter of the corresponding RF chains, the controller 210 may perform calibration of the phased array antenna.

Figure 5:
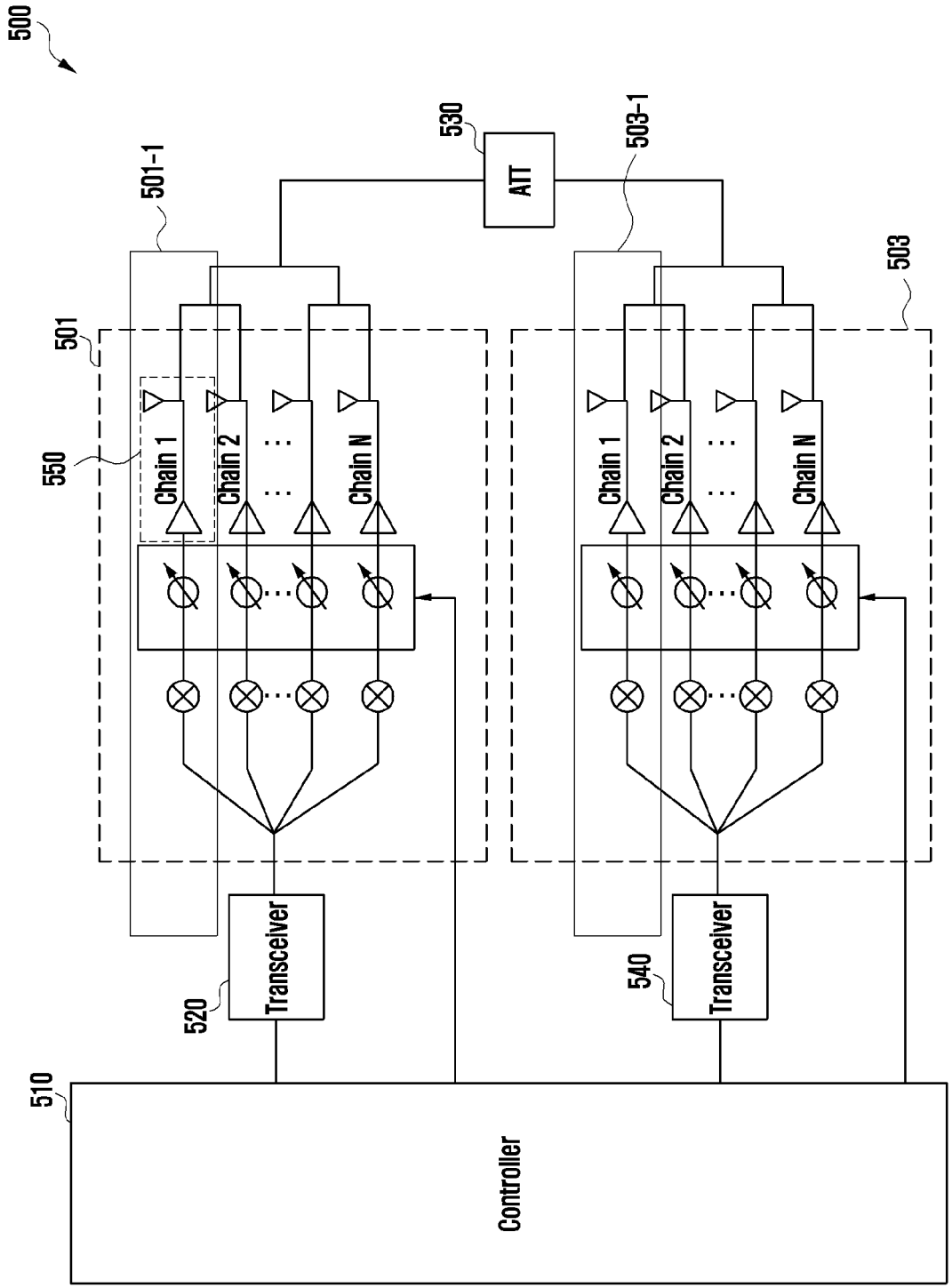
FIG. 5 is a block diagram illustrating a constitution of a calibration device according to an embodiment of the disclosure.

FIG. 5 is a block diagram illustrating a configuration of a calibration device 500 according to an embodiment of the disclosure.

According to an embodiment, the calibration device according to FIG. 5 may be configured as a part of a communication device including a multi-stream transceiver (or transceiver). For example, a communication device including a multi-stream transceiver may include a plurality of transceivers and be a communication device in which a phased array antenna is connected to each transceiver.

With reference to FIG. 5, the calibration device 500 may include a first transceiver 520 and a second transceiver 540 and include a first phased array antenna 501 connected to the first transceiver 520 and a second phased array antenna 503 connected to the second transceiver 540.

According to an embodiment, although the first transceiver 520 and the second transceiver 540 are illustrated as separate modules, they may be included in one module. Further, the first transceiver 520 and the second transceiver 540 may be included in the controller 510.

When the calibration device 500 performs calibration, in case that the first transceiver 520 is in a transmission mode (Tx mode), the second transceiver 540 may operate in a reception (Rx mode) mode. Further, in case that the first transceiver 520 is in a reception mode (Rx mode), the second transceiver 540 may operate in a transmission (Tx mode) mode.

The first phased array antenna and the second phased array antenna may be connected through a coupler. According to an embodiment, the calibration device 500 may be configured to directly receive a phase-converted signal by a phase shifter through the coupler (or coupling circuit) instead of receiving a signal radiated from at least one RF chain for calibration. For example, the coupling circuit may be configured to connect an output terminal of a power amplifier included in each RF chain in a phased array antenna in a transmission mode and an input terminal of a receiver included in each RF chain in a phased array antenna in a reception mode.

When the first transceiver 520 is in a transmission mode, a test signal transmitted through the first phased array antenna may be monitored by the coupler and be transmitted to a receiving terminal of the second phased array antenna.

According to an embodiment, a test signal identified through the coupler from an amplifier output terminal of the first phased array antenna operating in a transmission mode may be combined to a combiner, be divided into a divider through an attenuator, and then be transferred to an amplifier input terminal of the second phased array antenna operating in a reception mode. That is, the calibration device 500 may calibrate the phased array antenna using a loopback signal of a communication device including a plurality of transceivers and at least one phased array antenna connected to each of the plurality of transceivers. A configuration of a circuit 550 including at least one coupler for the loopback signal will be described later with reference to FIG. 6.

Figure 6:
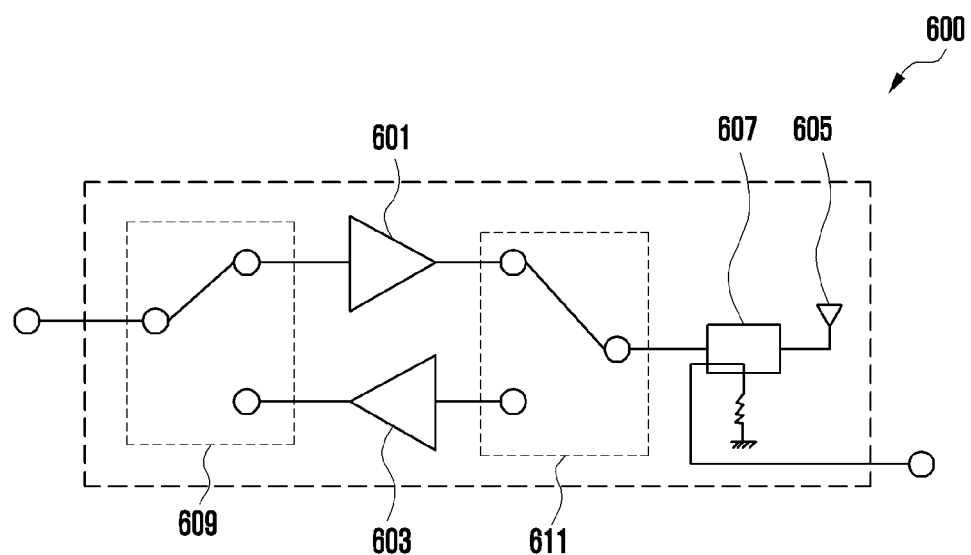
FIG. 6 is a circuit diagram illustrating a constitution of a coupler in a calibration device according to an embodiment of the disclosure.

FIG. 6 is a circuit diagram illustrating a constitution of a coupler in a calibration device according to an embodiment of the disclosure.

With reference to FIG. 6, in a circuit 600 including a coupler, a coupler 607 may be configured between the amplifier and the radiator. According to an embodiment, in the calibration device including a dual stream transceiver, each of the plurality of RF chains included in each of the phased array antennas may include an amplifier for a transmission mode and a reception mode. For example, a power amplifier 601 for a transmission mode and a low-noise amplifier 603 for a reception mode are connected in parallel between the radiator and the phase shifter of the RF chain, and switches 609 and 611 are connected at both ends, respectively of the amplifiers so that they may be selectively driven. In this case, the coupler 607 may be configured between the radiator and the switch 611 connected in a direction of the radiator in the amplifier.

That is, the coupler may identify a signal output through the power amplifier configured in the RF chain of the phased array antenna operating in a transmission mode and output a loopback signal to the low noise amplifier configured in the RF chain of the phased array antenna operating in a reception mode.

Returning to FIG. 5, the test signal monitored through the coupler may be transmitted to a part of the second phased array antenna. According to an embodiment, when the second transceiver 540 operates in a reception mode, the controller 510 may turn off some of the plurality of RF chains included in the second phased array antenna. For example, the controller 510 may turn off the remaining RF chains except for the RF chain 503-1 of the second phased array antenna in a reception mode of the second transceiver 540.

The controller 510 may determine a phase code set for RF chains for calibration among a plurality of RF chains included in the first phased array antenna 501, and transmit a test signal in which the phase code set is applied to an initial input signal.

The test signal transmitted through the first phased array antenna 501 may be monitored through the coupler and be transmitted to the RF chain 503-1 of the second phased array antenna 503. The controller 510 may apply Equation 6 to calibrate the plurality of first phased array antennas 501 based on the test signal transmitted from the first phased array antenna 501 and the test signal received from the radiator of the RF chain 503-1 of the second phased array antenna 503.

For example, in Equation 6, when the variable A for a phase shift occurring in the phased array antenna 100 of the transmitting side that transmits the test signal is considered, in the calibration using the loopback signal, it is necessary to consider together a variable AR for the phase shift generated in the second phased array antenna 503 of the receiving side as well as a variable AT for the phase shift generated in the first phased array antenna 501 of the transmitting side.

A linear equation for calibrating the first phased array antenna 501 using the loopback signal is as follows.

$$Y = H_R \cdot A_R \cdot L_{ATT} \cdot H_T \cdot A_T \cdot x \qquad \text{[Equation 10]}$$

where x is an initial input signal, HT is a known random phase value determined for a test signal at the first phased array antenna 501, and HR may be a measured phase value corresponding to any known phase value determined for the test signal identified in the RF chain 503-1 by receiving the test signal in the second phased array antenna 503.

Equation 10 may be arranged in a manner similar to Equations 7 to 9.

For example, $$A_T = \begin{bmatrix} a_{T1} \\ \vdots \\ a_{Tm} \end{bmatrix} \qquad \text{[Equation 11]}$$

$$H_T = [e^{j\theta_{T1}} \ \ldots \ e^{j\theta_{Tm}}] \qquad \text{[Equation 12]}$$

$$H_R = [e^{j\theta_{R1}} \ \ldots \ e^{j\theta_{Rm}}] \qquad \text{[Equation 13]}$$

is applied, and in case of calibrating the first phased array antenna 501, because the remaining RF chains except for the RF chain 503-1 of the second phased array antenna 503 were turned off, θRn of the HR side may be determined to a fixed value (e.g., 0), and HR·AR·LATT may be determined as a constant value CR.

According to an embodiment, for solving Equation 10, the technique described with reference to FIG. 3 in order to calculate Equation 1 may be similarly applied. For example, when calibrating the m number of RF chains, unknown AT requires aT1, aT2, to aTm, that is, the m number of linear equations; thus, HT is determined as an m×m matrix, and Equation 10 may be arranged as follows for AT.

$$A_T = \frac{1}{c_R} \cdot H_T^{-1} \cdot (Y \cdot x^{-1}) \qquad \text{[Equation 14]}$$

That is, Equation 14 is arranged similarly to Equation 6, and by determining the variable AT for the phase shift from the initial phase for each of the m number of RF chains, the controller 510 may determine a phase difference of the initial phase applied to each of the m number of RF chains.

According to an embodiment, Equation 14 is an equation for determining a variable value for a phase shift in RF channels that have transmitted a test signal using an initial input signal, a transmitting signal in which a plurality of phase code sets are applied to the initial input signal, and components of phase values measured for RF channels that transmit the test signal and therefore, Equation 14 may be applied to a calibration device using the measuring instrument 240 of FIG. 2.

According to an embodiment, in order to minimize inaccuracy of the solution in Equations 6 and 14, it is necessary to determine the condition number cond(H) of a matrix H (or HT) to be as small as possible. In this case, when such a phase difference deviation occurs large for a plurality of RF chains, a load for identifying the phase difference may occur or a high performance device may be required; thus, it is necessary to arrange or improve the calculation result of the phase difference so that such a deviation is measured to be small.

Accordingly, according to an embodiment, the Hadamard matrix is known to have the minimum number of conditions (e.g., cond(H)=1) in the case of m of the order 2 k case, as illustrated in Equation 15.

$$H_{H1} = 1 \qquad \text{[Equation 15]}$$
$$H_{H2n} = \begin{bmatrix} H_{Hn} & H_{Hn} \\ H_{Hn} & -H_{Hn} \end{bmatrix}$$

(where 2n is the number of RF c s included in the phased array antenna or the number of RF chains for calibration)

However, a problem in the case of applying the Hadamard matrix is that the sum of a first row is m and the sum of a second row is 0. In general, as phased array systems are symmetrically designed, a radial shape of the antenna array is not accurate, but is generally almost uniformly aligned.

Figure 7:
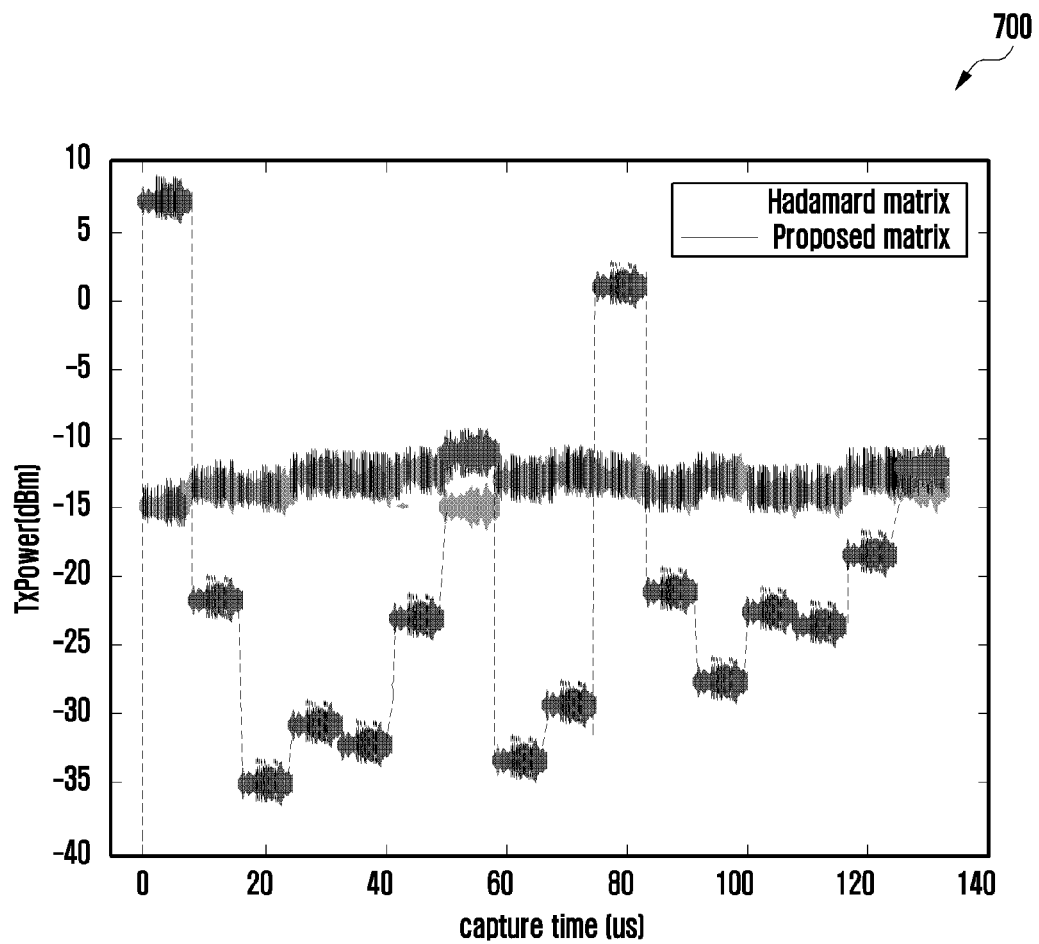
FIG. 7 is a graph illustrating a result of a test signal when a Hadamard matrix or a proposed matrix is applied in relation to reduction of inaccuracy of a solution for calibration according to an embodiment of the disclosure.

That is, when the Hadamard matrix is applied, the form in which a first measured value y1 becomes very large and a next measured value y2 becomes very small as the result of applying the Hadamard matrix illustrated in FIG. 7 is repeatedly displayed, and a very high signal-to-noise ratio (SNR) for the system is required, which reduces efficiency of the calibration.

FIG. 7 is a graph 700 illustrating a result of a test signal when a Hadamard matrix or a proposed matrix is applied in relation to reduction of inaccuracy of a solution for calibration according to an embodiment of the disclosure.

With reference to the result of applying the Hadamard matrix to Equation 14 in the graph 700, in identifying phase control values for RF channels of the phased array antenna, the power magnitude deviation of transmitting signals appears to be high, and in order to measure this, a high performance signal measuring equipment is required.

Accordingly, as illustrated in Equation 16, a new matrix in which the condition number of H (or HT) is 1 may be proposed.

$$H_{P1} = 1 \qquad \text{[Equation 16]}$$
$$H_{p2n} = \begin{bmatrix} H_{Pn} & H_{Pn} \cdot e^{j\frac{2}{\pi}} \\ H_{Pn} \cdot e^{j\frac{2}{\pi}} & H_{Pn} \end{bmatrix}$$

(where 2n is the number of RF chains included in the phased array antenna or the number of RF chains for calibration)

In the case of Equation 16, the sum of rows is expressed as the same value, and for example, HP16 is expressed as Equation 17, and the sum of each row is determined to −4.

$$H_{p16} = \begin{pmatrix} 1 & j & j & -1 & j & -1 & -1 & -j & j & -1 & -1 & -j & -1 & -j & -j & 1 \\ j & 1 & -1 & j & -1 & j & -j & -1 & -1 & j & -j & -1 & -j & -1 & 1 & -j \\ j & -1 & 1 & j & -1 & -j & j & -1 & -1 & -j & j & -1 & -j & 1 & -1 & -j \\ -1 & j & j & 1 & -j & -1 & -1 & j & -j & -1 & -1 & j & 1 & -j & -j & -1 \\ j & -1 & -1 & -j & 1 & j & j & -1 & -1 & -j & -j & 1 & j & -1 & -1 & -j \\ -1 & j & -j & -1 & j & 1 & -1 & j & -j & -1 & 1 & -j & -1 & j & -j & -1 \\ -1 & -j & j & -1 & j & -1 & 1 & j & -j & 1 & -1 & -j & -1 & -j & j & -1 \\ -j & -1 & -1 & j & -1 & j & j & 1 & 1 & -j & -j & -1 & -j & -1 & -1 & j \\ j & -1 & -1 & -j & -1 & -j & -j & 1 & 1 & j & j & -1 & j & -1 & -1 & -j \\ -1 & j & -j & -1 & -j & -1 & 1 & -j & j & 1 & -1 & j & -1 & j & -j & -1 \\ -1 & -j & j & -1 & -j & 1 & -1 & -j & j & -1 & 1 & j & -1 & j & j & -1 \\ -j & -1 & -1 & j & 1 & -j & -j & -1 & -1 & j & j & 1 & -j & -1 & -1 & j \\ -1 & -j & -j & 1 & j & -1 & -1 & -j & j & -1 & -1 & -j & 1 & j & j & -1 \\ -j & -1 & 1 & -j & -1 & j & -j & -1 & -1 & j & -j & -1 & j & 1 & -1 & j \\ -j & 1 & -1 & -j & -1 & -j & j & -1 & -1 & -j & j & -1 & j & -1 & 1 & j \\ 1 & -j & -j & -1 & -j & -1 & -1 & j & -j & -1 & -1 & j & -1 & j & j & 1 \end{pmatrix}$$

In FIG. 7, when the matrix proposed in relation to reduction of inaccuracy of the solution for calibration according to an embodiment of the disclosure is applied, the result of the test signal may be identified.

With reference to the result of applying a matrix proposed in Equation 14, in identifying a phase difference for RF channels of the phased array antenna, the power magnitude deviation of transmitting signals appears evenly, and a performance of the device for measuring this is not significantly limited, and may be advantageously applied in terms of cost and calibration speed.

As described above, by identifying the phase difference for RF chains in a state in which the proposed matrix is applied, the calibration device may determine a phase control value more effectively.

As described above, the result of applying the Hadamard matrix to Equation 14 and the result of applying the proposed matrix are illustrated in the measurement result graph 700 of FIG. 7. According to an embodiment, the graph 700 is a graph of an envelope-power change for phase shifts (PSs) of 16 phase code sets in the test signal identified through the measuring instrument 240.

A 5G mmWave transceiver should be able to switch simultaneously all PSs within a 100 ns transient time in every symbol. The symbol duration of a 5G NR FR2 120 kHz sub-carrier interval appears to be about 8.9 us.

According to an embodiment, as described above, a power dynamic range according to a PS configuration of the Hadamard matrix is 40 dB or more, and a power dynamic range according to a PS configuration of the proposed matrix appears to about 5 dB. When the PS configuration is switched in every symbol period of 5G NR, the measurement duration of 16 elements may be performed in less than 150 us.

According to an embodiment, operations described with reference to FIG. 5, 6, or 7 may be processed through the controller 510 of the calibration device 200. With reference to FIG. 5, the controller 510 is configured in the singular and is illustrated as being connected to the first transceiver 520 and the second transceiver 540, but the controller 510 may be configured in the plural and be connected to the first transceiver 520 and the second transceiver 540, respectively.

Figure 8:
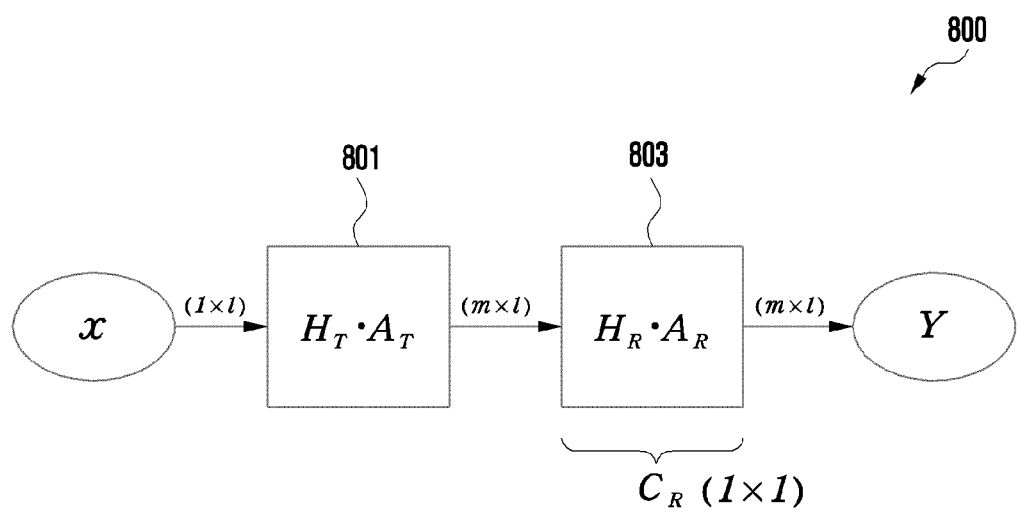
FIG. 8 is a block diagram illustrating a signal processing flow in the calibration device according to an embodiment of the disclosure.

FIG. 8 is a block diagram illustrating a signal processing flow in a calibration device according to an embodiment of the disclosure.

According to an embodiment, when the calibration device includes a dual stream transceiver, as described above, the calibration device may include a first stream transceiver 801 and a second stream transceiver 803. The components of Equation 10 may be described in comparison with detailed components of the calibration device with reference to FIG. 8.

The first stream transceiver 801 may configure known phases to RF chains in order to calibrate a phase shift of the RF chains in a transmission mode, and apply and transmit the configured phases to an initial input signal x (a length 1 of the signal).

In this case, the calibration device may transmit a signal as much as the number m of RF chains of the first transceiver 801 for calibration and receive a signal Y through the coupler to identify a phase difference of the RF chains.

The calibration device may generate a linear equation for the received signal Y using the received signal (e.g., the test signal or the second signal). According to an embodiment, by defining RF chains of the first transceiver 801 of the transmitting side to HT·AT and RF chains of the second transceiver 803 of the receiving side to HR·AR, the calibration device may determine a phase difference of ideal phases configured to the RF chains of the first transceiver 801.

According to an embodiment, when the calibration device calibrates RF chains of the first transceiver, the calibration device may also consider configured phases and a signal transmitted and received by the first transceiver 801 in a reception mode and the second transceiver 803 in a transmission mode.

Further, at least one attenuator may be included between the first transceiver 801 and the second transceiver 803 of the calibration device. In this case, a variable LATT by the attenuator may be applied to the calculation.

Figure 9A:
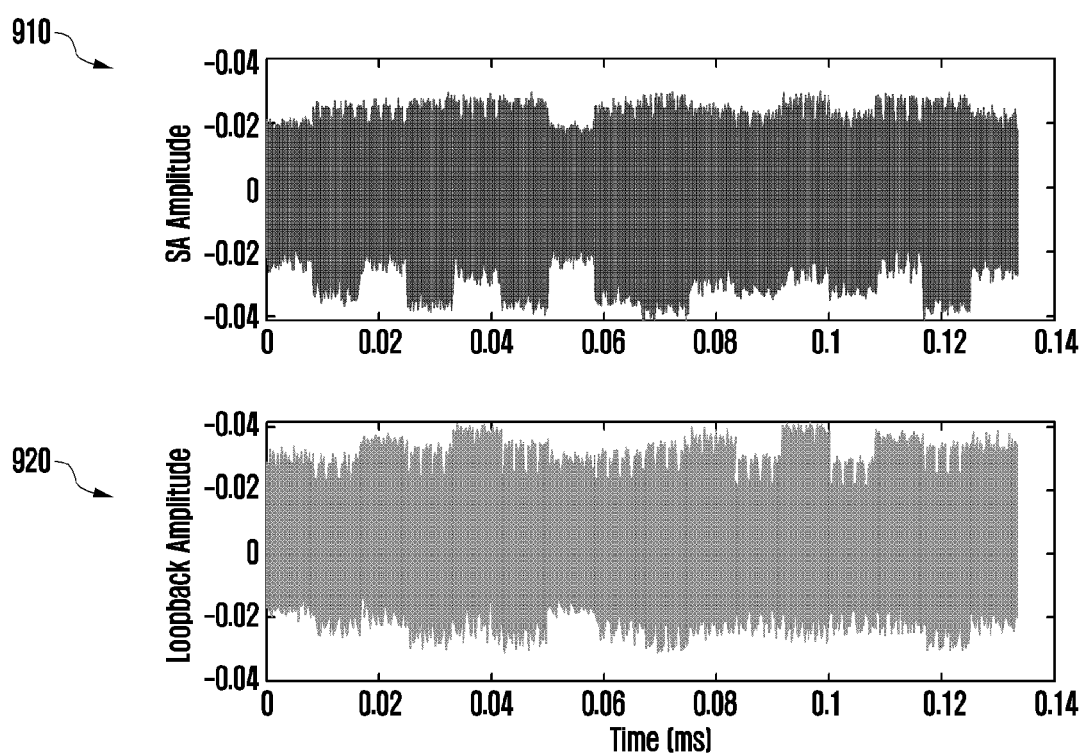
FIGS. 9A and 9B are graphs illustrating a calibration result using a measuring instrument and a calibration result using a loopback signal in a transmission mode of a calibration device according to an embodiment of the disclosure.
Figure 9B:
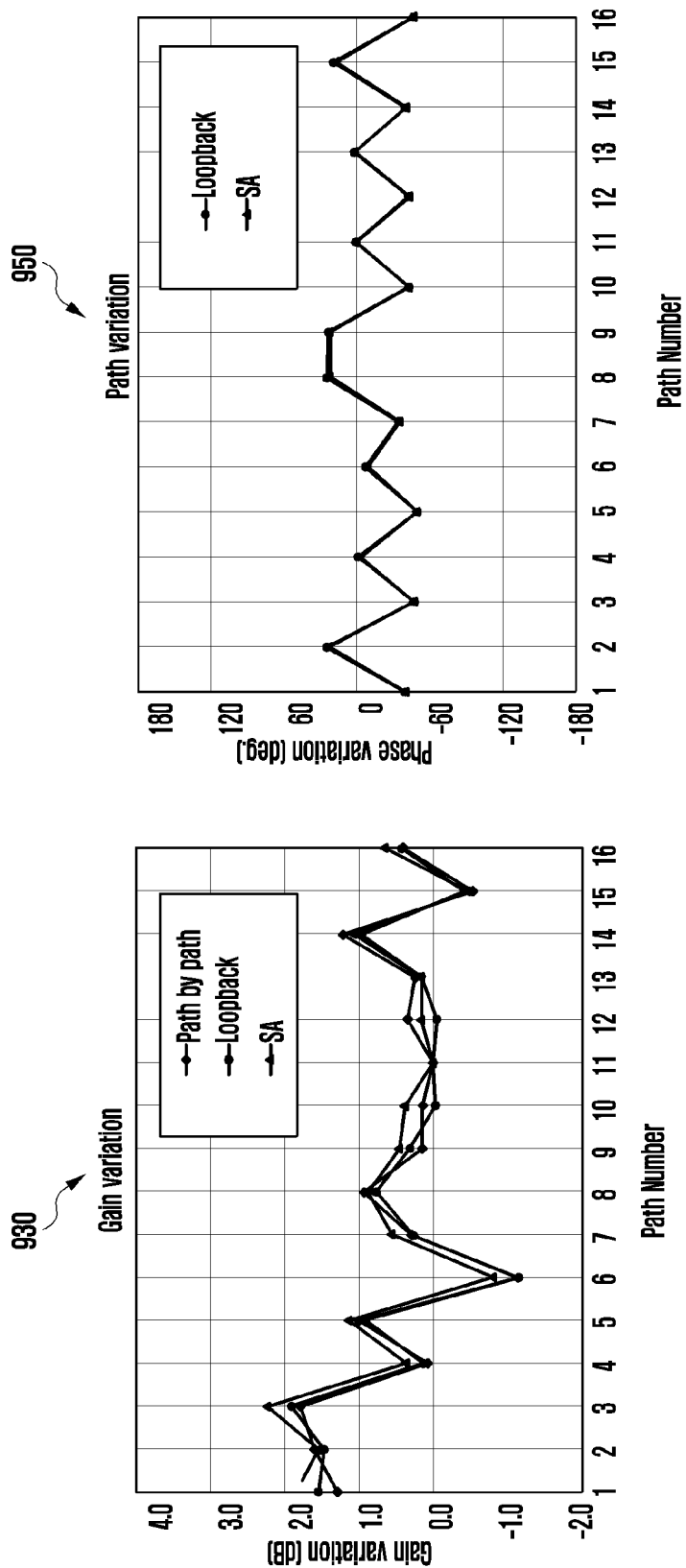

FIGS. 9A and 9B are graphs illustrating a calibration result using a measuring instrument and a calibration result using a loopback signal in a transmission mode of a calibration device according to an embodiment of the disclosure.

FIG. 9A illustrates a graph 910 representing a measurement result of a test signal according to calibration using the measuring instrument 240 and a graph 920 of a measurement result of a test signal according to calibration using a loopback signal of the first phased array antenna 501.

FIG. 9B illustrates a gain variation graph 930 and a phase variation graph 950 for a measurement result of a test signal according to 1:1 calibration of RF channels included in the phased array antenna, a measurement result of a test signal according to calibration using the measuring instrument 240, and a measurement result of a test signal according to calibration using a loopback signal of the first phased array antenna 501.

Figure 10A:
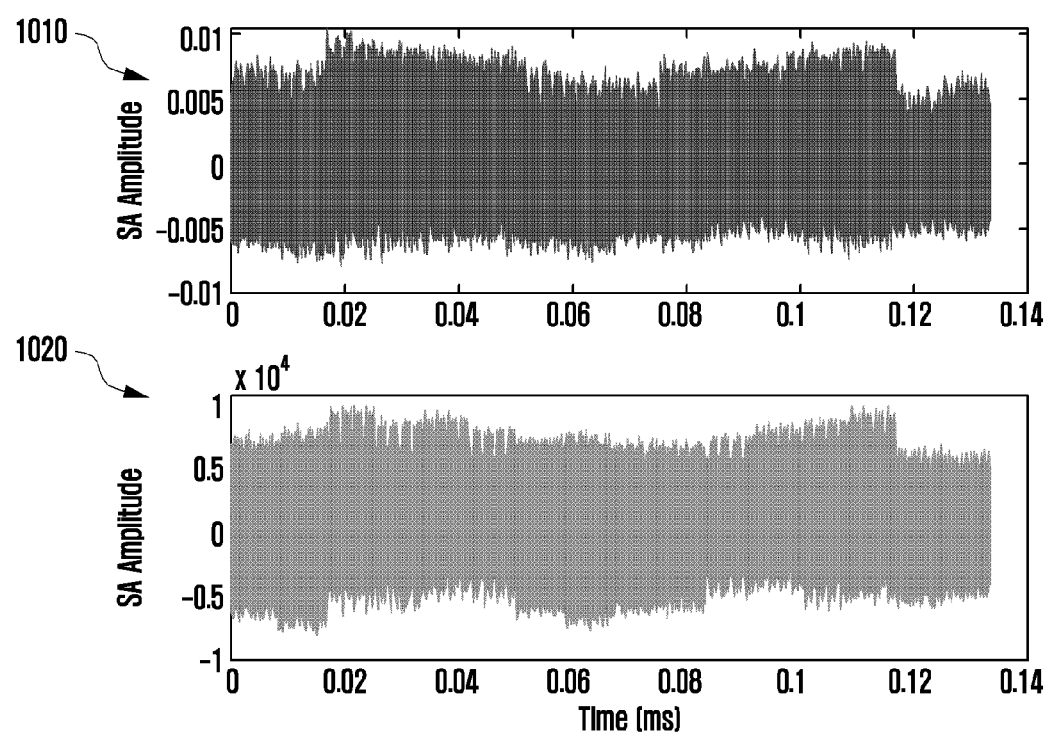
FIGS. 10A and 10B are graphs illustrating a calibration result using a measuring instrument and a calibration result using a loopback signal in a reception mode of a calibration device according to an embodiment of the disclosure.
Figure 10B:
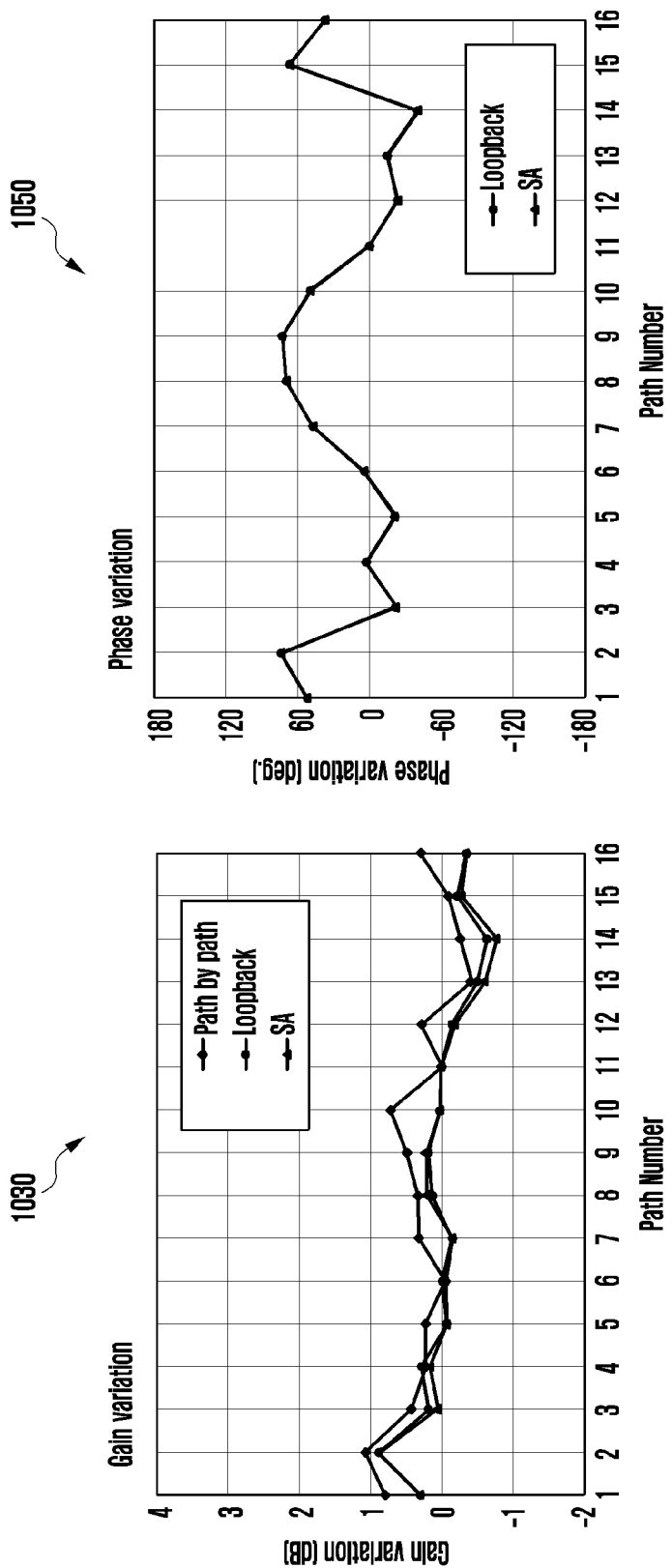

FIGS. 10A and 10B are graphs illustrating a calibration result using a measuring instrument and a calibration result using a loopback signal in a reception mode of a calibration device according to an embodiment of the disclosure.

FIG. 10A illustrates a graph 1010 representing a measurement result of a test signal according to calibration using the measuring instrument 240 and a graph 1020 of a measurement result of a test signal according to calibration using a loopback signal of the first phased array antenna 501.

FIG. 10B illustrates a gain variation graph 1030 and a phase variation graph 1050 for a measurement result of a test signal according to 1:1 calibration of RF channels included in the phased array antenna, a measurement result of a test signal according to calibration using the measuring instrument 240, and a measurement result of a test signal according to calibration using the loopback signal of the first phased array antenna 501.

Figure 11:
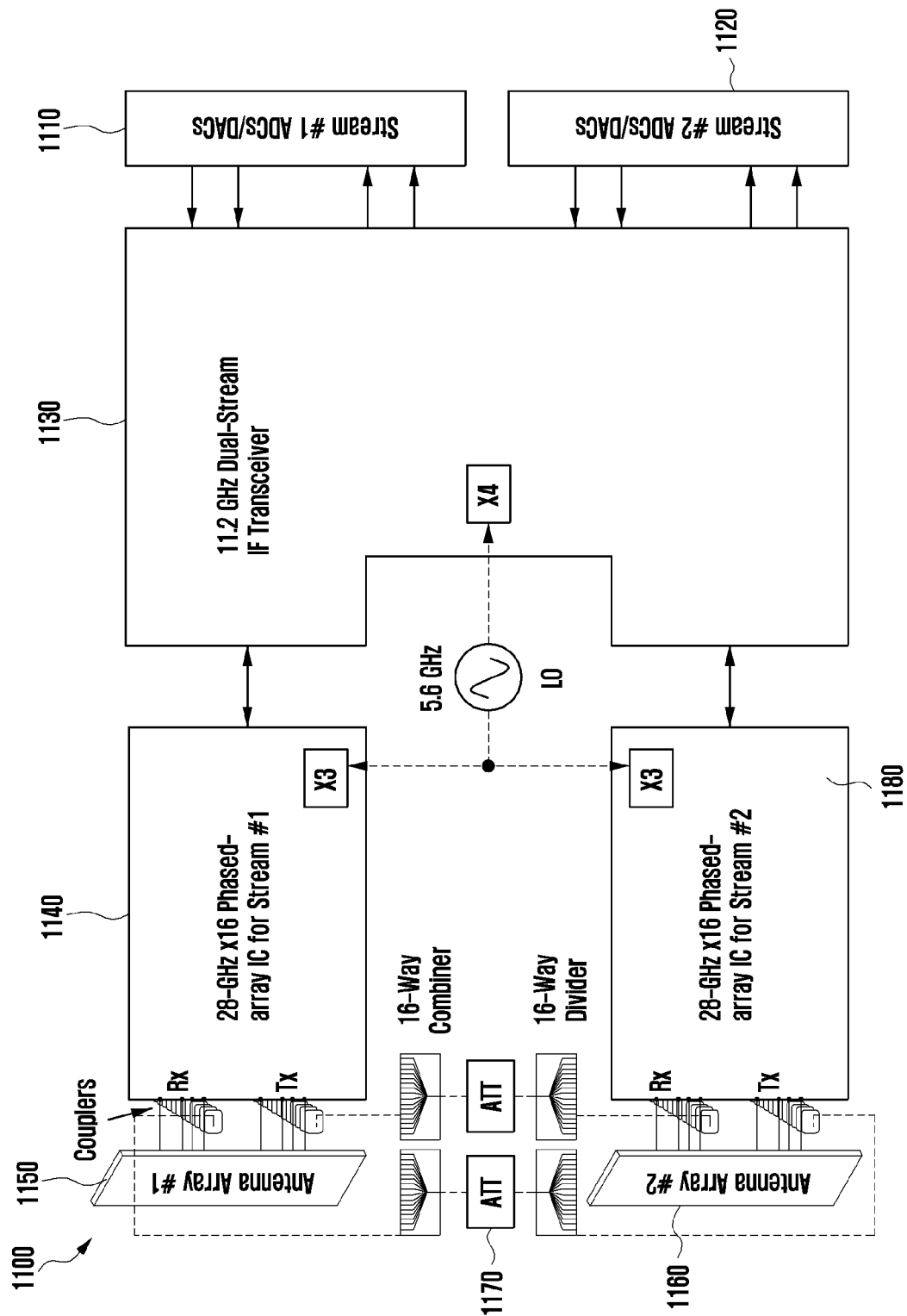
FIG. 11 is a block diagram illustrating a calibration device using a loopback signal according to an embodiment of the disclosure.

FIG. 11 is a block diagram 1100 of a calibration device using a loopback signal according to an embodiment of the disclosure.

According to an embodiment, the calibration device 200 may be a device including a dual-stream transceiver. In the calibration device 200, a baseband Tx signal from digital-to-analog converters (DACs) is up-converted to 11.2 GHz intermediate-frequency (IF), is up-converted back to 28 GHz, and is transmitted to the antenna array. Further, the 28 GHz Rx signal from the antenna arrays is down-converted to 11.2 GHz IF, down-converted back to a baseband, and is transmitted to analog-to-digital converters (ADCs).

In a calibration mode of the calibration device 200, a transceiver 1110 for a stream #1 may operate in a Tx mode, and a transceiver 1120 for a stream #2 may operate in an Rx mode. In this case, a Tx signal from a 28 GHz phased array IC (28GIC) 1140 may be monitored through a coupler, be coupled through a 16-way combiner, be divided through a 16-way divider through an attenuator (ATT) 1170, and then be coupled into an Rx port of another 28GIC 1180.

Figure 12:
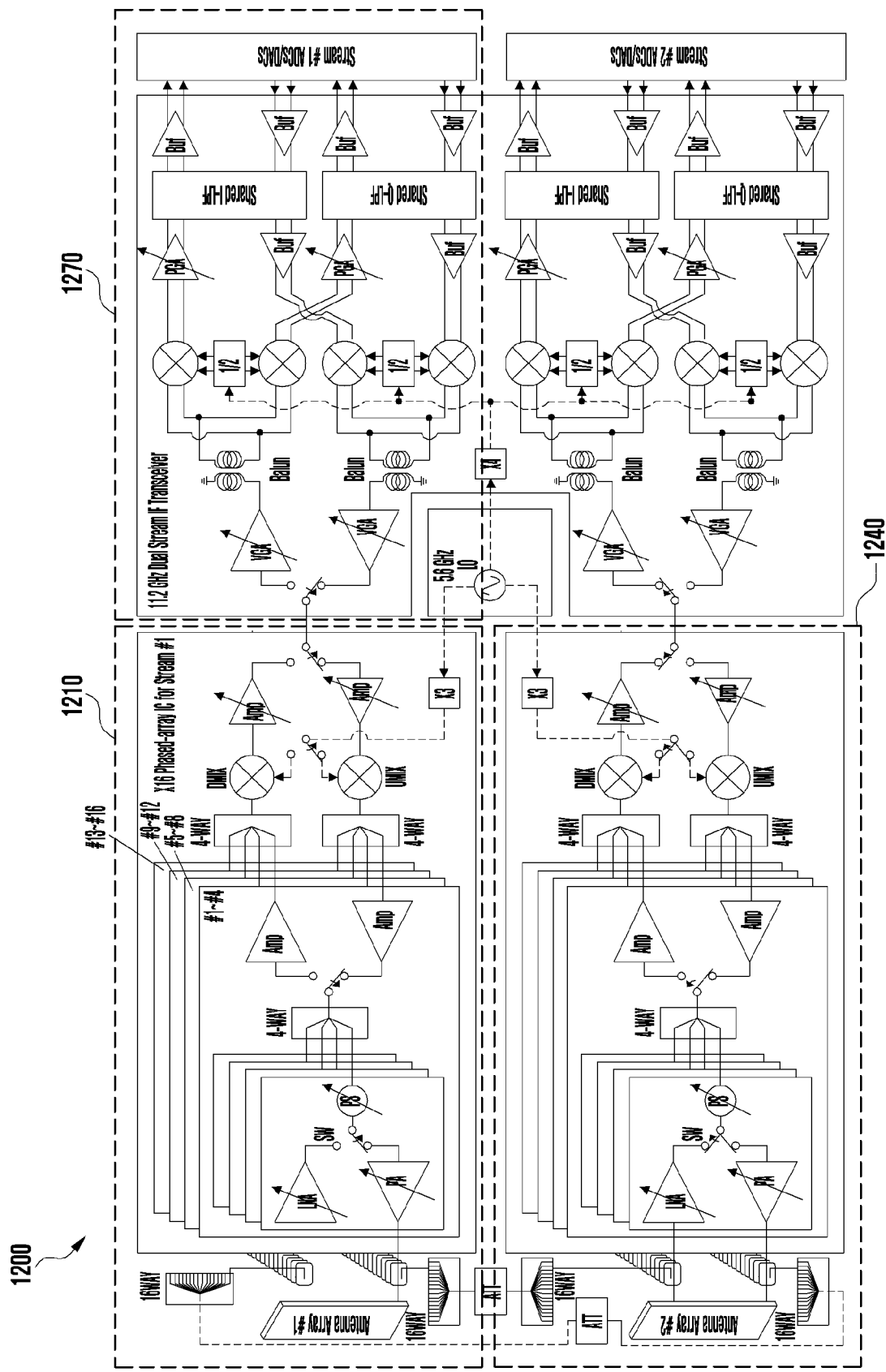
FIG. 12 is a block diagram illustrating a detailed configuration of a calibration device using a loopback signal according to an embodiment of the disclosure.

FIG. 12 is a block diagram 1200 illustrating a detailed configuration of a calibration device using a loopback signal according to an embodiment of the disclosure.

The calibration device 200 may include at least one of 28-GHz×16 phased-array ICs 1210 and 1214 and include a 11.2 GHz dual-stream IF transceiver (IFIC) 1270.

With reference to FIG. 12, the 28 GHz×16 phased array IC 1210 may include 4 TRx blocks, a 4-way Wilkinson combiner, an up/down mixer, an IF variable amplifier, an IF switch, a local-oscillator (LO) switch, and an LO frequency tripler.

Each of the TRx blocks may include four TRx elements, a 4-way Wilkinson combiner, an Rx amplifier, and a Tx driver amplifier.

Each of the TRx elements includes a low-noise amplifier (LNA), a power amplifier (PA), a switch, and a 4-bit bidirectional passive phase shifter (PS). IFICs may include variable-gain amplifiers (VGA), baluns, inphase- and quadrature-phase (IQ) down mixers (DMIX), IQ up mixers (UMIXx), programmable gain amplifiers (PGA), 4th-order passive low-pass filters (LPFs), buffer amplifiers (Buf), and LO frequency quadruplers.

Figure 13A:
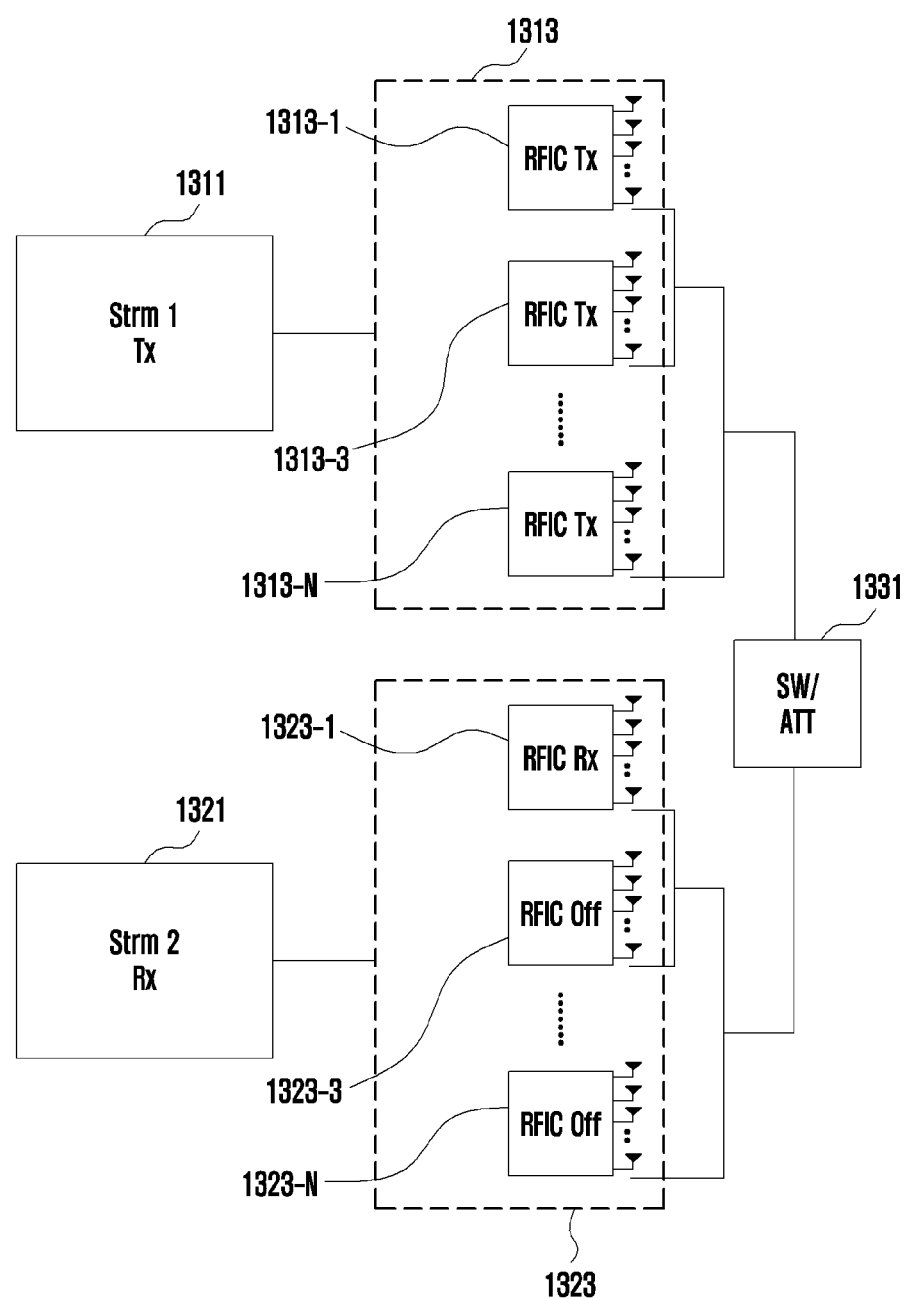
FIGS. 13A and 13B are block diagrams illustrating a constitution of a calibration device using a loopback signal according to an embodiment of the disclosure.
Figure 13B:
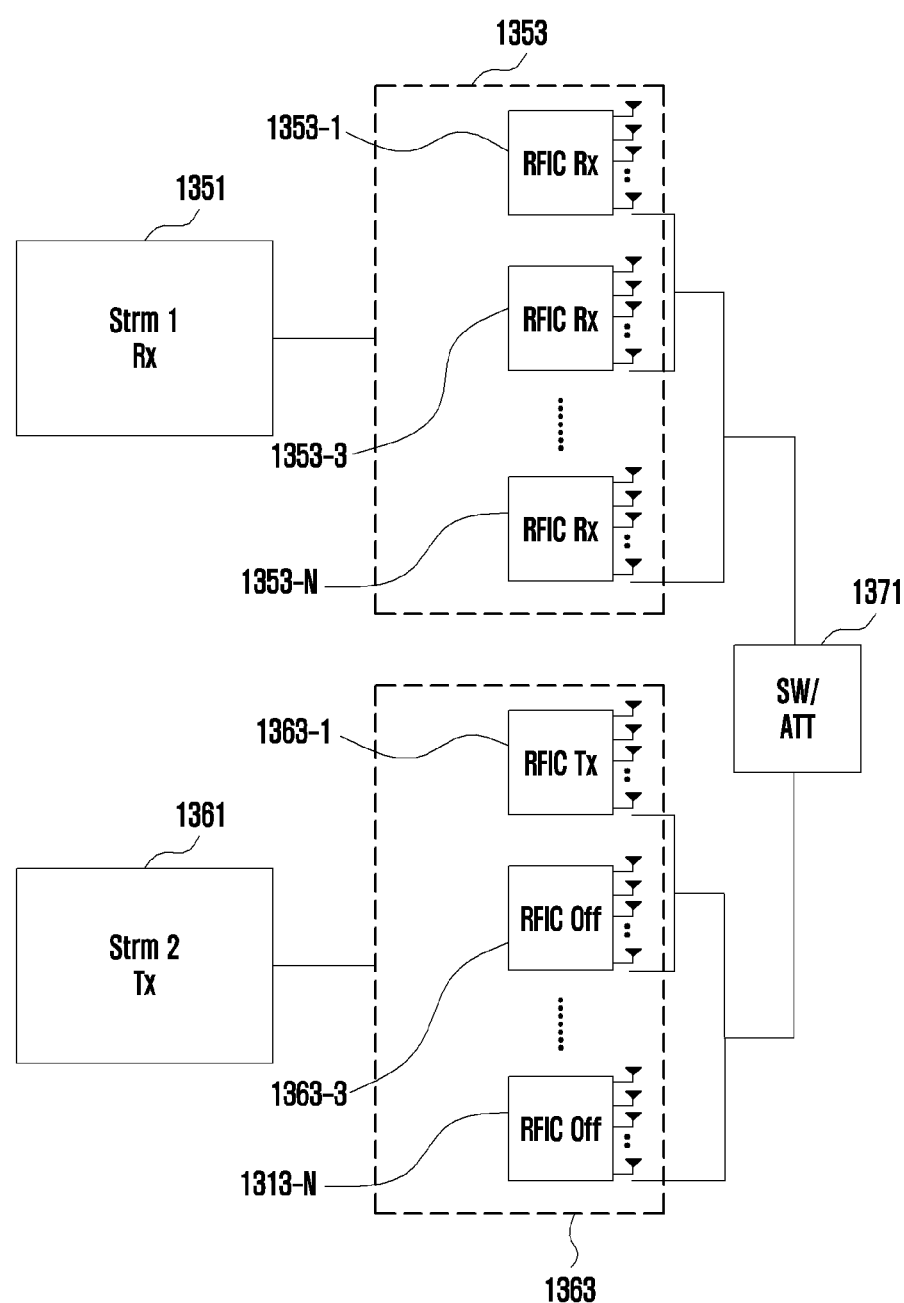

FIGS. 13A and 13B are block diagrams illustrating a configuration of a calibration device using a loopback signal according to an embodiment of the disclosure.

According to an embodiment, the calibration device of FIG. 13A may include a transmitter 1311 of a first stream strm1, a phased array antenna 1313 for transmission connected thereto, a receiver of a second stream strm2, and a phased array antenna 1323 for reception connected thereto. In this case, the phased array antenna 1313 for transmission may include a plurality of RFICs 1313-1, 1313-3, and 1313-N for transmission, and the phased array antenna 1313 for reception may include a plurality of RFICs 1323-1, 1323-3, and 1323-N for reception.

According to an embodiment, each of the plurality of RFICs 1313-1, 1313-3, and 1313-N for transmission may include a plurality of RF channels for reception. For example, each of a plurality of RF channels included in the phased array antenna 100 of FIGS. 1 and 2A may include a plurality of RF channels for reception.

That is, the RF chain 110-1 of FIG. 1 may include a plurality of RF chains, and in this case, the RF chain 110-1 may be configured in a modular manner.

Similarly, each of the plurality of RFICs 1323-1, 1323-3, and 1323-N for reception may include a plurality of RF channels for reception. For example, each of a plurality of RF channels included in the phased array antenna 101 of FIG. 2B may include a plurality of RF channels for reception.

That is, the RF chain 101-1 of FIG. 2A may include a plurality of RF chains, and in this case, the RF chain 101-1 may be configured in a modular manner.

According to an embodiment, a signal transmitted through the transmitter 1311 of a first stream strm1 and a plurality of RFICs 1313-1, 1313-3, and 1313-N connected thereto may be transmitted through a radiator included in each of a plurality of RFICs 1313-1, 1313-3, to 1313-N. In this case, when the RFICs 1313-1, 1313-3, and 1313-N are calibrated using a loopback signal, the signal transmitted from each of the plurality of RFICs 1313-1, 1313-3, and 1313-N may be monitored through the coupler and be transmitted to the RFIC 1323-1 connected to a receiver 1321 of a second stream strm2 in a reception mode through at least one of a combiner, an attenuator (or switch) 1331, or a divider.

The calibration device may determine phase control values of RFICs 1313-1, 1313-3, and 1313-N using the test signal received in the RFIC 1323-1 and the mathematical technique described with reference to FIG. 5.

As illustrated in FIG. 13A, when the calibration device calibrates a plurality of RFIC modules connected to the transmitter 1311 of a first stream strm1, the calibration device may use one RFIC module including one RF channel or a plurality of RF channels among the phased array antenna connected to the receiver 1321 of a second stream strm2.

According to an embodiment, in calibrating an RFIC module including a plurality of RF channels and a phased array antenna including a plurality of RFIC modules, by assuming that a performance of each of the plurality of RF channels included in one RFIC module is the same and assuming that there is a difference in a performance of each of the plurality of RFIC modules, the calibration device may process to calibrate the relative phase difference between the RFIC modules included in the phased array antenna.

According to an embodiment, the calibration device of FIG. 13B may include a receiver 1351 of a first stream strm1, a phased array antenna 1353 for reception connected thereto, a transmitter 1361 of a second stream strm2, and a phased array antenna 1363 for transmission connected thereto.

In this case, the phased array antenna 1353 for reception may include a plurality of RFICs 1353-1, 1353-3, and 1353-N for reception, and the phased array antenna 1363 for transmission may include a plurality of RFICs 1363-1, 1363-3, and 1363-N for transmission.

In this case, the calibration device may process to calibrate the plurality of RFICs 1353-1, 1353-3, and 1353-N connected to the receiver 1351 of a first stream strm1.

According to an embodiment, the test signal may be transmitted through an RFIC 1363-1 connected to the transmitter 1361 of a second stream strm2, and in this case, the transmitted test signal may be monitored through the coupler and be transmitted to RFICs 1353-1, 1353-3, and 1353-N connected to the receiver 1351 of a first stream strm1 in a reception mode through at least one of a combiner, a attenuator (or switch) 1371, or a divider.

The calibration device may determine phase control values of RFICs 1353-1, 1353-3, and 1353-N using a test signal received by the phased array antenna 101 of FIG. 2B and the mathematical technique described with reference to FIG. 5.

Figure 14A:
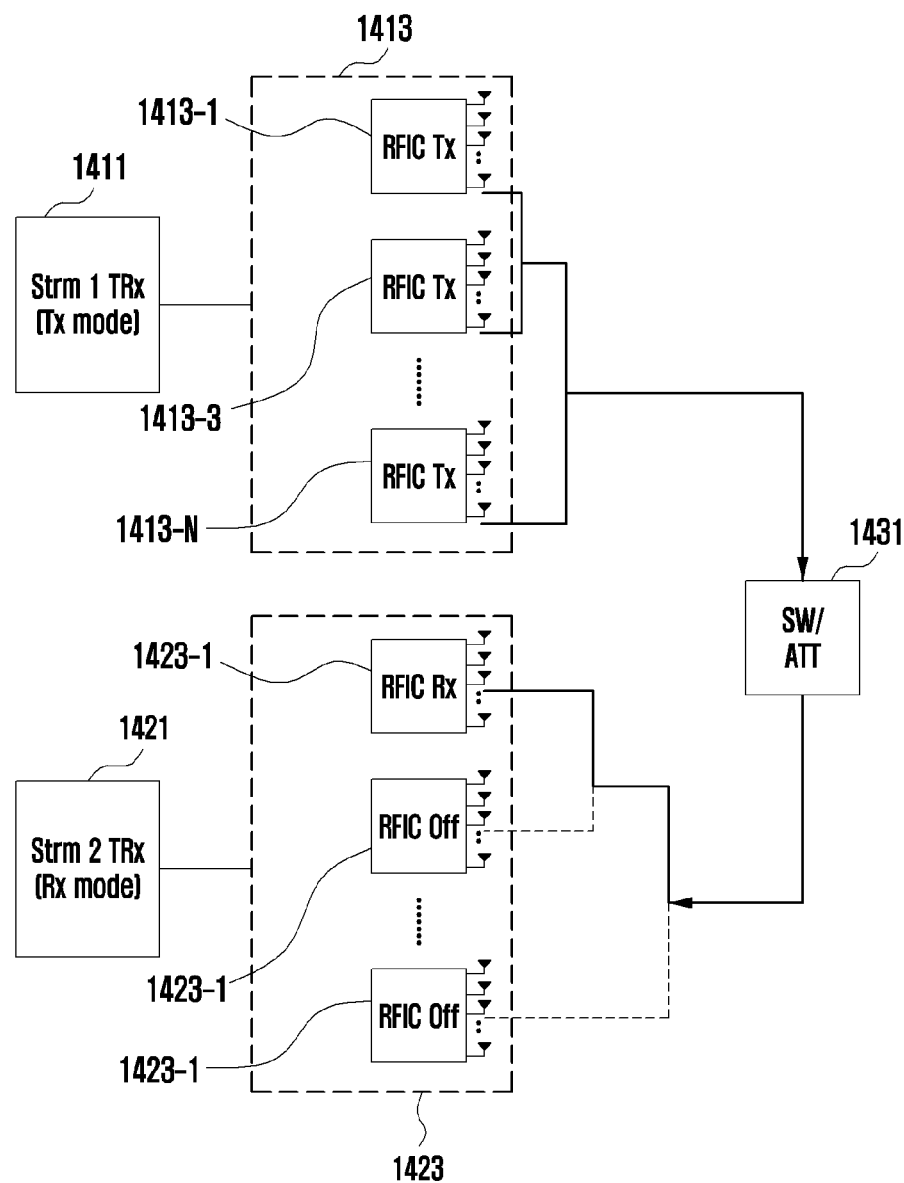
FIGS. 14A and 14B are block diagrams illustrating a constitution of a calibration device using a loopback signal according to an embodiment of the disclosure.
Figure 14B:
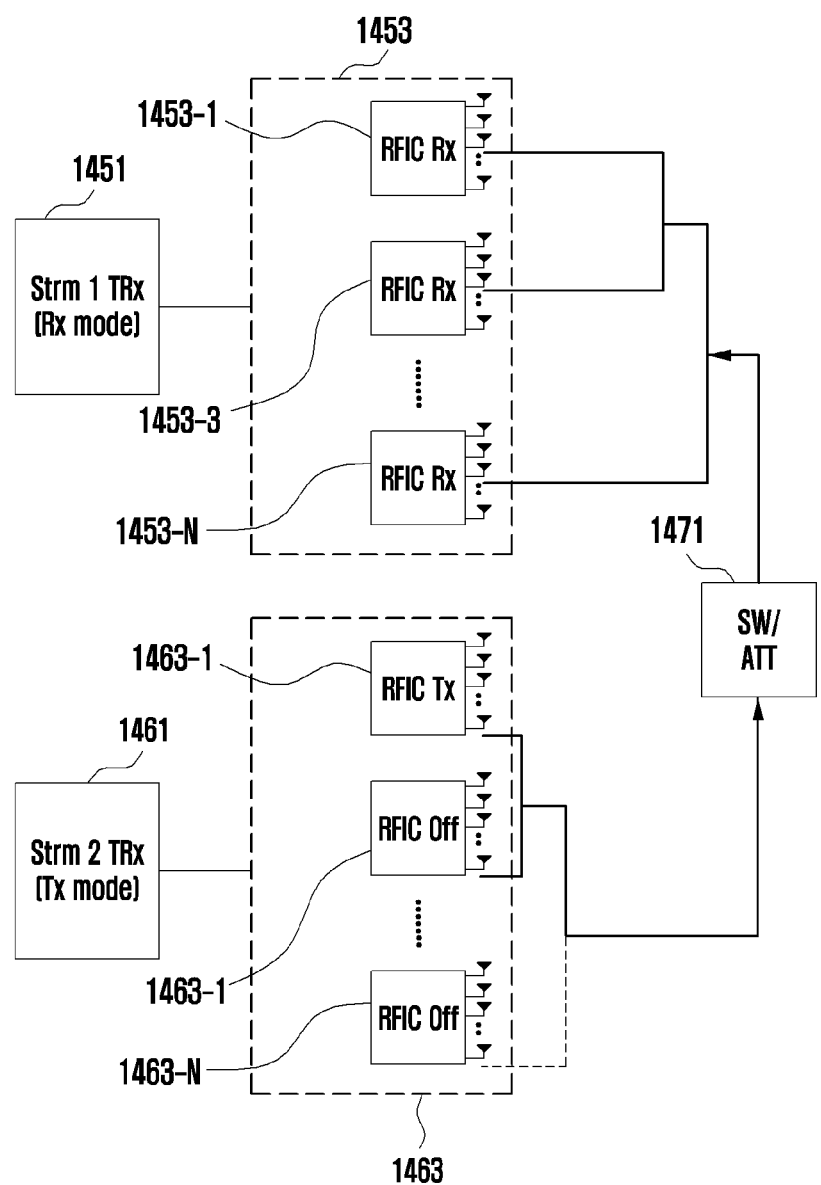

FIGS. 14A and 14B are block diagrams illustrating a configuration of a calibration device using a loopback signal according to an embodiment of the disclosure.

With reference to FIG. 14A, a transceiver 1411 of a first stream strm1 operating in a transmission mode or a transceiver 1421 of a second stream strm2 operating in a reception mode may be configured with the first transceiver 520 or the second transceiver 540 described with reference to FIG. 5.

The transceiver 1411 of a first stream strm1 or the transceiver 1421 of a second stream strm2 may operate in the same manner as or a similar manner to the transmitter 1311 of a first stream strm1 or the receiver 1321 of a second stream strm2 described with reference to FIG. 13A, and the receiver 1351 of a first stream strm1 or the transmitter 1361 of a second stream strm2 described with reference to FIG. 13B.

According to various embodiments, in order to calibrate each RFIC module, the calibration device may select at least one radiator for identifying or transmitting a test signal through a coupler among a plurality of radiators included in each RFIC module.

For example, as illustrated in FIG. 14A, the calibration device may obtain a test signal through an n-th radiator of a plurality of radiators included in each of RFICs 1413-1, 1413-3, to 1413-N operating in a transmission mode connected to the transceiver 1411 of a first stream strm1 operating in a transmission mode and transmit a test signal to a third radiator of an RFIC 1423-1 in an on state among radiators of RFICs 1423-1, 1423-3 to 1423-N operating in a reception mode connected to the transceiver 1421 of a second stream strm2 operating in a reception mode.

With reference to FIG. 14B, a transceiver 1461 of a first stream strm1 operating in a transmission mode or a transceiver 1451 of a second stream strm2 operating in a reception mode may be configured with the first transceiver 520 or the second transceiver 540 described with reference to FIG. 5.

The transceiver 1461 of a first stream strm1 or the transceiver 1451 of a second stream strm2 may operate in the same manner as or a similar manner to the transmitter 1311 of a first stream strm1 or the receiver 1321 of a second stream strm2 described with reference to FIG. 13A, and the receiver 1351 of a first stream strm1 or the transmitter 1361 of a second stream strm2 described with reference to FIG. 13B.

According to various embodiments, as described with reference to FIG. 14A, the calibration device may select at least one radiator for identifying or transmitting a test signal through a coupler among a plurality of radiators included in each RFIC module.

For example, as illustrated in FIG. 14B, the calibration device may obtain a test signal through an n-th radiator of RFIC 1463-1 in an on state among the plurality of radiators included in each of RFICs 1463-1, 1463-3, to 1463-N operating in a transmission mode connected to the transceiver 1461 of a second stream strm2 operating in a transmission mode and transmit a test signal to a third radiator among radiators of RFICs 1453-1, 1453-3, and 1453-N operating in a reception mode connected to the transceiver 1421 of a first stream strm1 operating in a reception mode.

As described above, an operation of transmitting and receiving a test signal for calibration by selecting at least one radiator of a plurality of radiators in each RFIC module may be performed through the controller. In this case, the controller may determine a radiator for transmission and reception of a test signal for calibration based on states of the phased array antenna or RFIC modules.

According to various embodiments, as described above, an operation of selecting at least one of the plurality of radiators included in the RFIC module to transmit and receive a test signal for calibration may be applied to the calibration device including a transmitter and a receiver, as illustrated in FIG. 13A or 13B.

Figure 15:
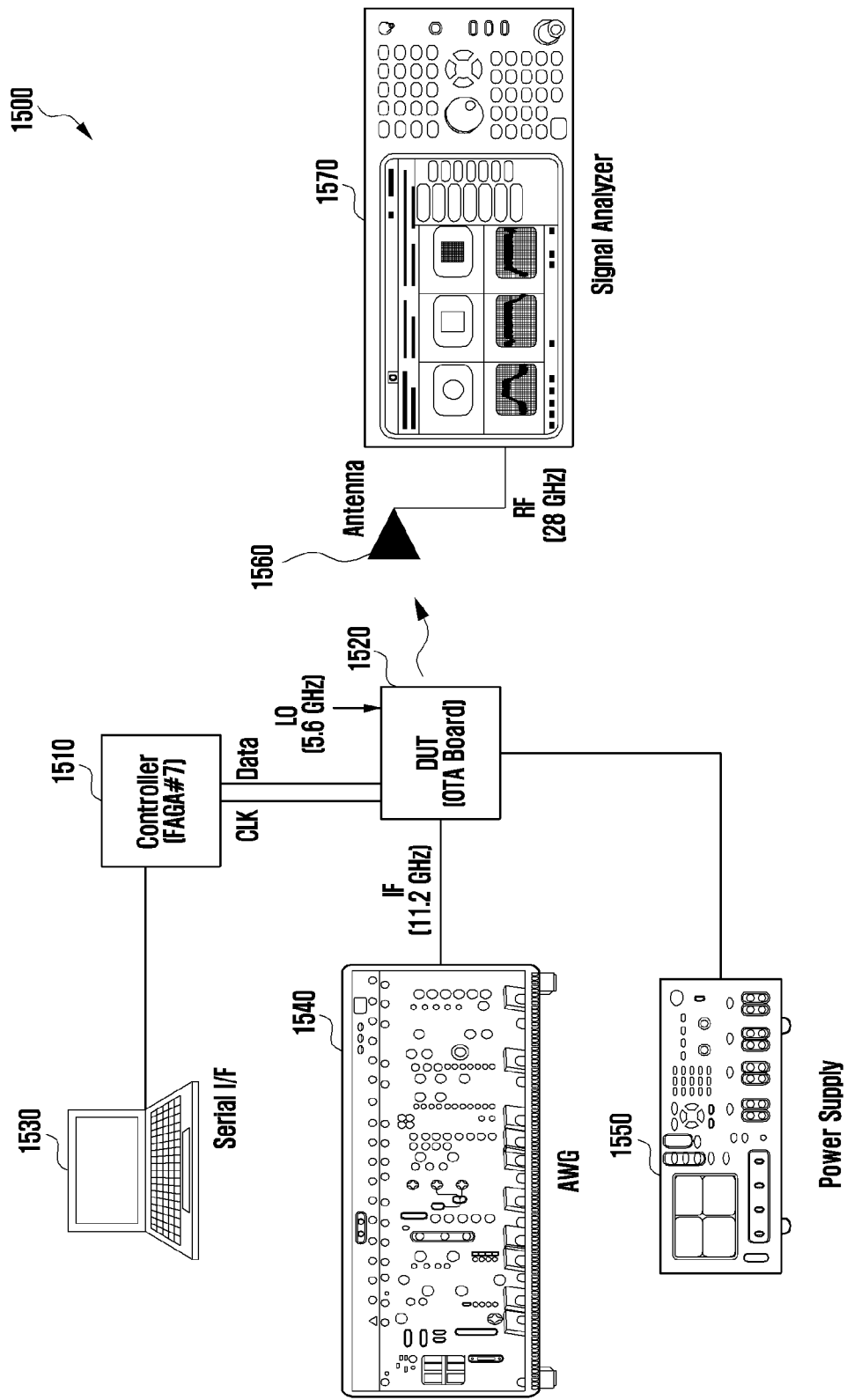
FIGS. 15 and 16 are diagrams illustrating a constitution of a device for measuring a calibration device according to an embodiment of the disclosure.
Figure 16:
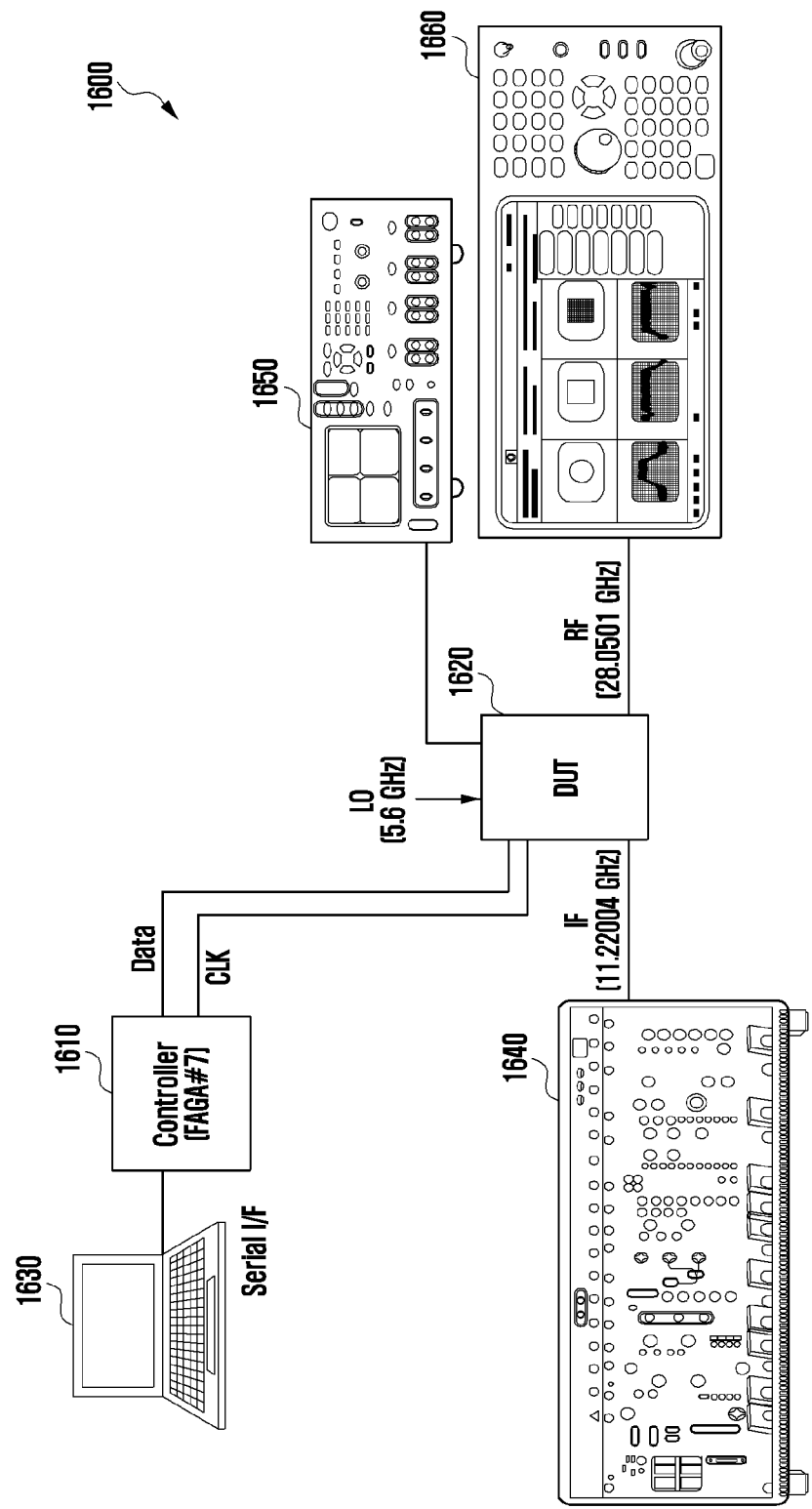

FIGS. 15 and 16 are diagrams illustrating a configuration of a device for simulating a calibration device according to an embodiment of the disclosure.

With reference to FIGS. 15 and 16, device block diagrams 1700 and 1800 for measurement of calibration include controllers 1710 and 1810 programmed for measurement and circuits 1520 and 1620 for implementing measurement. Here, the device may further include at least one of signal generators 1540 and 1640, power supplies 1550 and 1650, or signal analyzers 1560 and 1660 for operating the circuits 1520 and 1620.

With reference to FIG. 15, for measurement in an embodiment of receiving a wirelessly transmitted test signal and analyzing the test signal by the measuring instrument, a reception antenna 1570 connected to the signal analyzer 1560 may be further included.

With reference to FIG. 16, a configuration of a circuit 1620 will be described for measurement in an embodiment of analyzing a transmitting signal obtained through a coupler.

According to an embodiment, an onboard 16-way Wilkinson combiner used for the measurement was connected to a power amplifier (PA) output of 28GIC instead of being connected to the antenna and coupler. The combiner output was connected to a directional coupler, and an output port of the directional coupler was connected to a signal analyzer. A 20 dB coupling port of the directional coupler is connected to the onboard 16-way divider, and distributed ports are connected to inputs of another low noise amplifier (LNA) of 28GIC. A 14-bit 2-differential-channel arbitrary waveform generator was used as DACs, and a 10-bit 4-channel oscilloscope was used as ADCs. A 1.96608-GSps Zadoff-Chu sequence with a bandwidth of 100 MHz with 4096 samples was used as an initial input signal x of the test signal.

Figure 17:
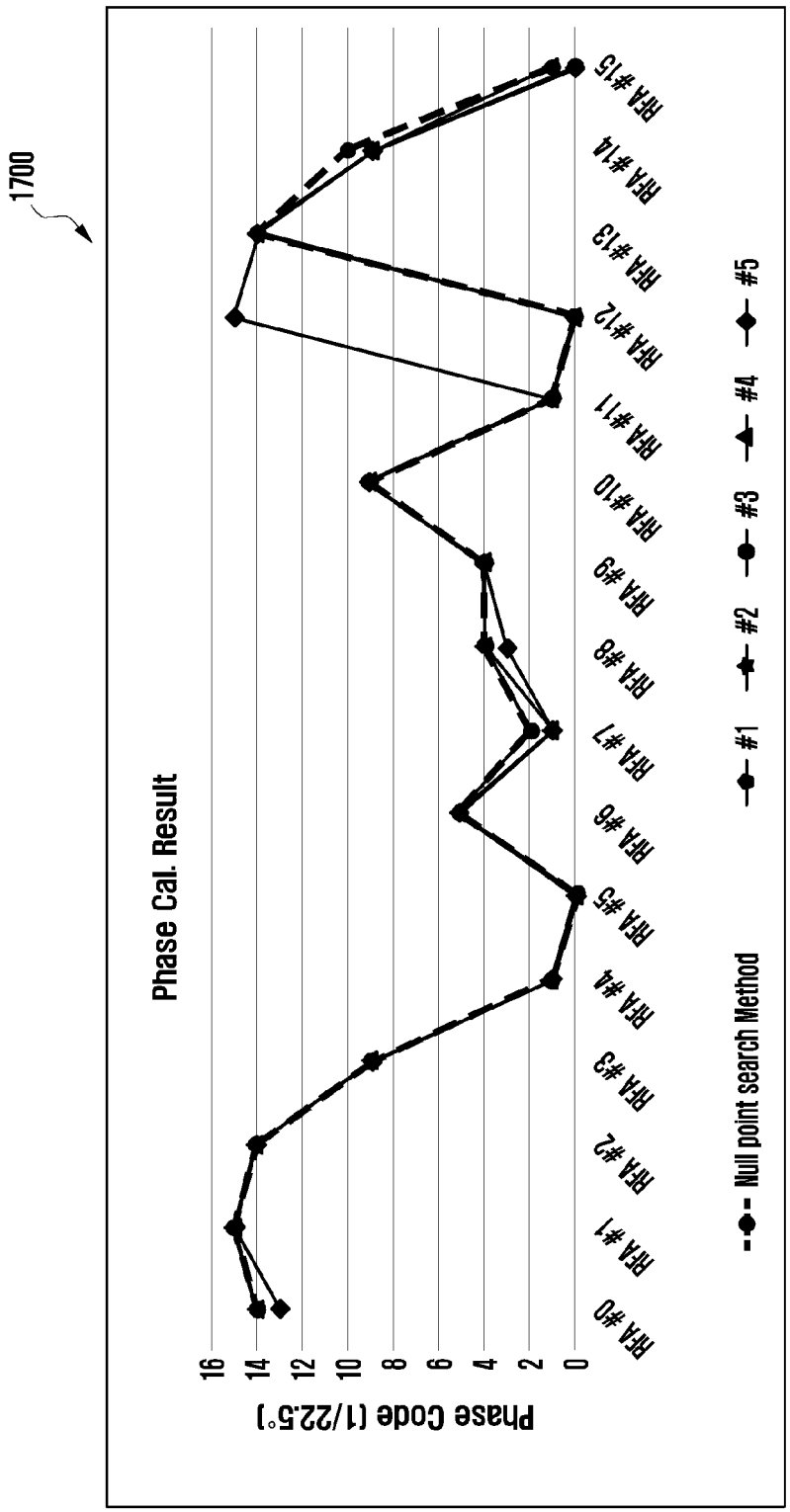
FIG. 17 is a graph illustrating a measurement result of a calibration device according to an embodiment of the disclosure.

According to an embodiment, the measurement result of the calibration device configured as described above may be identified, as illustrated in Tables 1 and 2 and FIG. 17.

TABLE 1

|  | RFIC #0 | RFIC #1 | RFIC #2 | RFIC #3 | RFIC #4 | RFIC #5 | RFIC #6 | RFIC #7 |
|---|---|---|---|---|---|---|---|---|
| Null point search Method |  |  |  |  |  |  |  |  |
|  | 14 | 15 | 14 | 9 | 1 | 0 | 5 | 2 |
| Phase | 13 | 15 | 14 | 9 | 1 | 0 | 5 | 1 |
| Gain | −0.6 | −0.8 | −1.7 | −0.4 | −0.7 | 0 | −0.2 | −0.8 |
| Δ | −1 | 0 | 0 | 0 | 0 | 0 | 0 | −1 |
| Phase | 13 | 15 | 14 | 0 | 1 | 0 | 5 | 2 |
| Gain | 0 | −0.6 | −1.7 | −0.4 | −0.8 | 0 | 0.2 | −0.7 |
| Δ | −1 | 0 | 0 | 0 | 0 | 0 | 0 | 0 |
| Phase | 14 | 15 | 14 | 9 | 1 | 0 | 5 | 2 |
| Gain | −0.2 | −0.4 | −1.3 | 0.1 | −0.6 | 0 | 0.1 | −0.8 |
| Δ | 0 | 0 | 0 | 0 | 0 | 0 | 0 | 0 |
| Phase | 13 | 15 | 14 | 9 | 1 | 0 | 5 | 1 |
| Gain | 0 | −0.9 | −1.6 | −0.2 | −0.6 | 0 | 0.2 | −0.7 |
| Δ | −1 | 0 | 0 | 0 | 0 | 0 | 0 | −1 |
| Phase | 13 | 15 | 14 | 9 | 1 | 0 | 5 | 1 |
| Gain | −0.4 | −0.9 | −1.6 | −0.2 | −0.6 | 0 | 0.1 | −0.8 |
| Δ | −1 | 0 | 0 | 0 | 0 | 0 | 0 | −1 |

TABLE 2

|  | RFIC #8 | RFIC #9 | RFIC #10 | RFIC #11 | RFIC #12 | RFIC #13 | RFIC #14 | RFIC #15 |
|---|---|---|---|---|---|---|---|---|
| Null point search Method |  |  |  |  |  |  |  |  |
|  | 4 | 4 | 9 | 1 | 0 | 14 | 10 | 1 |
| Phase | 3 | 4 | 9 | 1 | 0 | 14 | 9 | 1 |
| Gain | −0.8 | −0.4 | −0.9 | 0.5 | −2.4 | −0.4 | −0.7 | −1.7 |
| Δ | −1 | 0 | 0 | 0 | 0 | 0 | −1 | 0 |
| Phase | 4 | 4 | 9 | 1 | 0 | 14 | 9 | 1 |
| Gain | −1.1 | −0.4 | −0.9 | 0.4 | −2.5 | −0.5 | −0.4 | −1.6 |
| Δ | 0 | 0 | 0 | 0 | 0 | 0 | −1 | 0 |
| Phase | 4 | 4 | 9 | 1 | 0 | 14 | 9 | 1 |
| Gain | −0.7 | −0.1 | −0.6 | 0.3 | −2.3 | −0.4 | −0.5 | −1.6 |
| Δ | 0 | 0 | 0 | 0 | 0 | 0 | −1 | 0 |
| Phase | 4 | 4 | 9 | 1 | 0 | 14 | 9 | 1 |
| Gain | −0.8 | 0 | −0.8 | 0.5 | −2.2 | −0.3 | −0.3 | −1.9 |
| Δ | 0 | 0 | 0 | 0 | 0 | 0 | −1 | 0 |

TABLE 2-continued

|       | RFIC #8 | RFIC #9 | RFIC #10 | RFIC #11 | RFIC #12 | RFIC #13 | RFIC #14 | RFIC #15 |
|-------|---------|---------|----------|----------|----------|----------|----------|----------|
| Phase | 3       | 4       | 9        | 1        | 15       | 14       | 9        | 0        |
| Gain  | -1      | -0.2    | -0.9     | -0.1     | -2.5     | -0.4     | -1.1     | -2       |
| Δ     | -1      | 0       | 0        | 0        | -1       | 0        | -1       | -1       |

FIG. 17 is a graph 1700 illustrating a measurement result of a calibration device according to an embodiment of the disclosure.

With reference to FIG. 17, an eleventh RFIC module (RFIC #11) illustrates a large difference from a configured phase when a test signal is transmitted. The calibration device may determine a phase difference and a phase control value of an eleventh RFIC module (RFIC #11) based on the identified phase information, as illustrated in Tables 1 and 2 based on the transmitted test signal and the received test signal and control a phase of the eleventh RFIC module (RFIC #11) to perform calibration.

Figure 18:
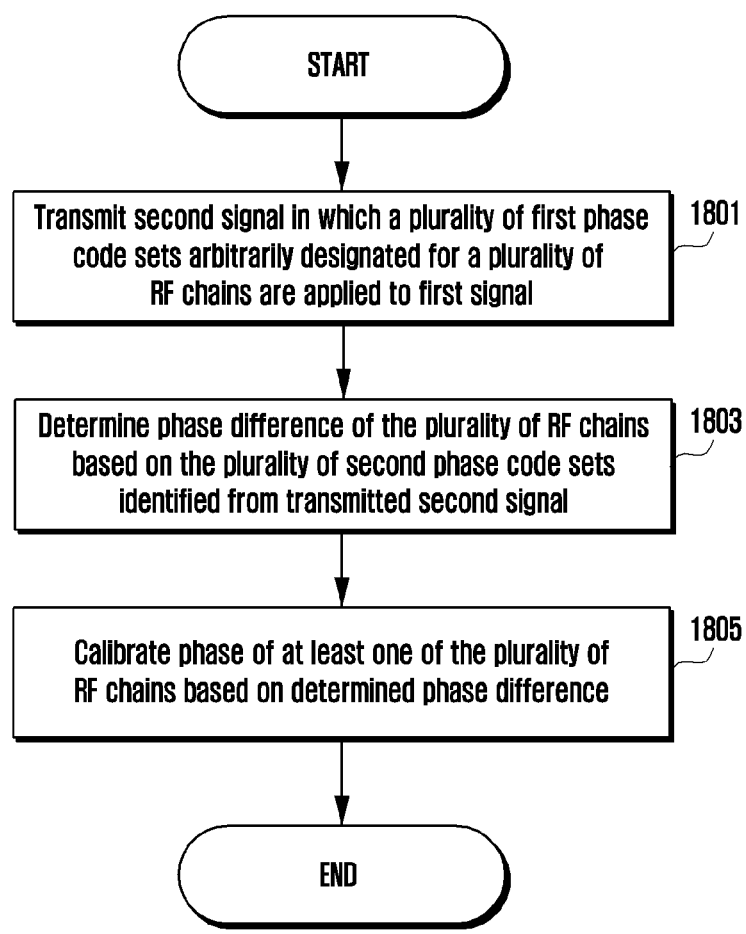
FIG. 18 is a flowchart illustrating an operation of a calibration device according to an embodiment of the disclosure.

FIG. 18 is a flowchart illustrating an operation of a calibration device according to an embodiment of the disclosure.

With reference to FIG. 18, in step 1801, the calibration device transmits a second signal in which a plurality of first phase code sets arbitrarily designated for a plurality of RF chains are applied to the first signal.

Here, the first signal may be an initial input signal. In order to calibrate a plurality of RF chains included in the phased array antenna, the calibration device may configure an arbitrary phase value among known phase values, and apply and transmit the phase value to the first signal.

According to an embodiment, the N number of linear equations are required to calibrate the N number of RF chains. For example, for each of the N number of RF chains, the N number of phase code sets may be generated by selecting an arbitrary value among known phase values, and the N number of different transmitting signals may be transmitted by applying each of the N number of generated phase code sets to the first signal.

That is, the second signal may include the N number of different transmitting signals, and be a test signal transmitted from the phased array antenna.

In step 1803, the calibration device determines a phase difference generated in the plurality of RF chains using the plurality of second phase code sets identified from the transmitted second signal.

According to an embodiment, the calibration device may determine a linear equation for determining a variable value for a phase shift in RF channels that have transmitted the second signal using a first signal, a transmitting signal to which a plurality of phase code sets are applied to the first signal, and components of a second phase code set measured for RF channels from a second signal including the plurality of transmitting signals.

For example, the calibration device may identify the N number of transmitting signals constituting the second signal, and identify the N number of second phase code sets including phase values for the N number of RF channels from each transmitting signal. The calibration device may generate the N number of linear equations based on phase values identified in the N number of transmitting signals included in the received test signal with respect to the phase values configured to the N number of transmitting signals at a time point of transmission, and calculate a variable a of a phase shift of the identified phase value compared to the phase value configured upon transmitting with respect to each RF channel to determine a phase difference of the N number of RF chains.

In step 1805, the calibration device may control phases of the RF chains corresponding to the determined phase difference based on the determined phase difference with respect to the N number of RF chains. In this case, the calibration device may maintain the phase of the RF chains temporarily or permanently in a controlled state.

According to an embodiment, in controlling the phase of the RF chains based on the determined phase difference, the calibration device is not limited to simply performing correction as much as the identified phase difference, but by arranging values for the phase difference for the identified RF chains, the calibration device may determine a phase control value that can more effectively calibrate the RF chains.

According to an embodiment, the calibration device may apply a proposed matrix so as to improve a performance in an operation of determining the phase control value. According to an embodiment, in determining the phase difference, an N×N square matrix for satisfying that a matrix for the phase values for the N number of RF chains and the N number of phase code sets identified from the test signal becomes the condition number 1 may be applied. In this case, the proposed N×N square matrix is determined so that the sum of each row converges to one constant.

That is, by adjusting a deviation of the phase difference of each of the RF chains to be small, the calibration device may more effectively control the phases of the RF chains.

Figure 19:
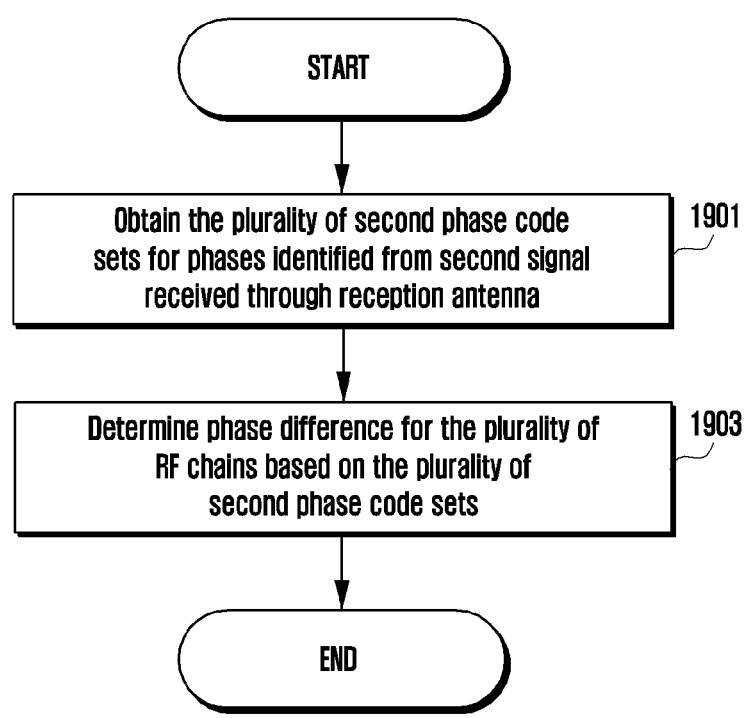
FIG. 19 illustrates a partial operation flow of a calibration device according to an embodiment of the disclosure.

FIG. 19 illustrates a partial operation flow of a calibration device according to an embodiment of the disclosure.

According to an embodiment, operations of FIG. 19 may be performed with a method of identifying a second signal transmitted from the calibration device. For example, step 1901 may be performed after step 1801 of FIG. 18.

In step 1901, the calibration device may receive a second signal transmitted from the phased array antenna through a reception antenna. The second signal received through the reception antenna may be transferred to a measuring instrument (or signal analyzer) connected to the reception antenna, and the measuring instrument may identify a second phase code set corresponding to a first phase code set from the received second signal.

In step 1903, the calibration device may determine a phase difference for the N number of RF chains using the second phase code set obtained from the second signal and/or the first phase code set applied to the first signal.

According to an embodiment, the measuring instrument may receive information on the second signal from the controller to identify the first phase code set, and identify the second phase code set from the received information on the second signal. According to another embodiment, the measuring instrument may identify information on the second signal included in the second signal received through the reception antenna.

The calibration device may determine the N number of linear equations and determine a phase difference for the N number of RF chains using phase values of the first phase code set and/or phase values of the second phase code set by applying the same method as or a similar method to the method described in step 1803 of FIG. 18.

When step 1903 is performed, the calibration device may end the operation of FIG. 19. When the operation of FIG. 19 is ended, the calibration device may perform step 1805 of FIG. 18.

Figure 20:
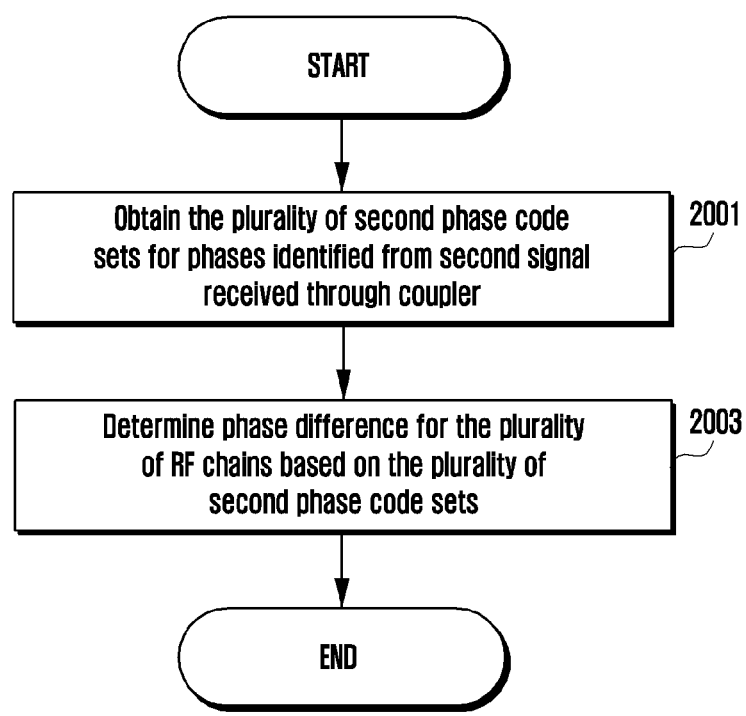
FIG. 20 illustrates a partial operation flow of a calibration device according to an embodiment of the disclosure.

FIG. 20 illustrates a partial operation flow of a calibration device according to an embodiment of the disclosure.

According to an embodiment, operations of FIG. 20 may be performed with a method of identifying a second signal transmitted from the calibration device. For example, step 2001 may be performed after step 1801 of FIG. 18.

In step 2001, the calibration device may receive a second signal transmitted from the phased array antenna through a coupler. For example, each of the N number of RF chains constituting the phased array antenna for transmitting the second signal may be connected to the coupler. The controller of the calibration device may receive a loopback signal monitored through the coupler as the second signal.

The controller may identify a second phase code set corresponding to the first phase code set from the received second signal.

In step 2003, the calibration device may determine a phase difference for the N number of RF chains using the second phase code set obtained from the second signal and/or the first phase code set applied to the first signal.

According to an embodiment, the controller may identify a first phase code set applied to the second signal transmitted through the phased array antenna, and may identify a second phase code set from information on the second signal received through the coupler.

The calibration device may determine the N number of linear equations and determine a phase difference for the N number of RF chains using phase values of the first phase code set and/or phase values of the second phase code set by applying the same method as or a similar method to the method described in step 1803 of FIG. 18.

When step 2003 is performed, the calibration device may end the operation of FIG. 20. When the operation of FIG. 20 is ended, the calibration device may perform step 1805 of FIG. 18.

Figure 21A:
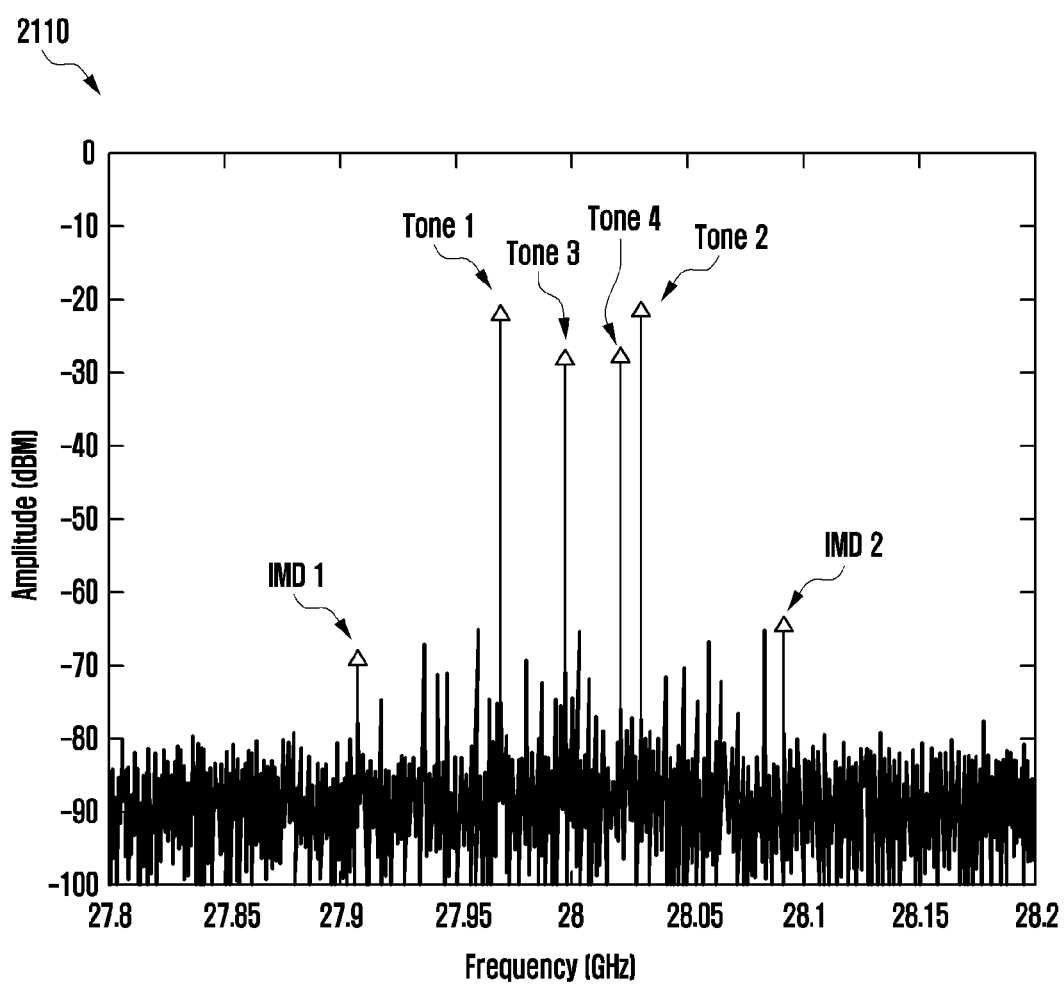
FIGS. 21A and 21B are graphs illustrating a calibration result using a measuring instrument and a calibration result using a loopback signal in a transmission mode of a calibration device according to an embodiment of the disclosure.
Figure 21B:
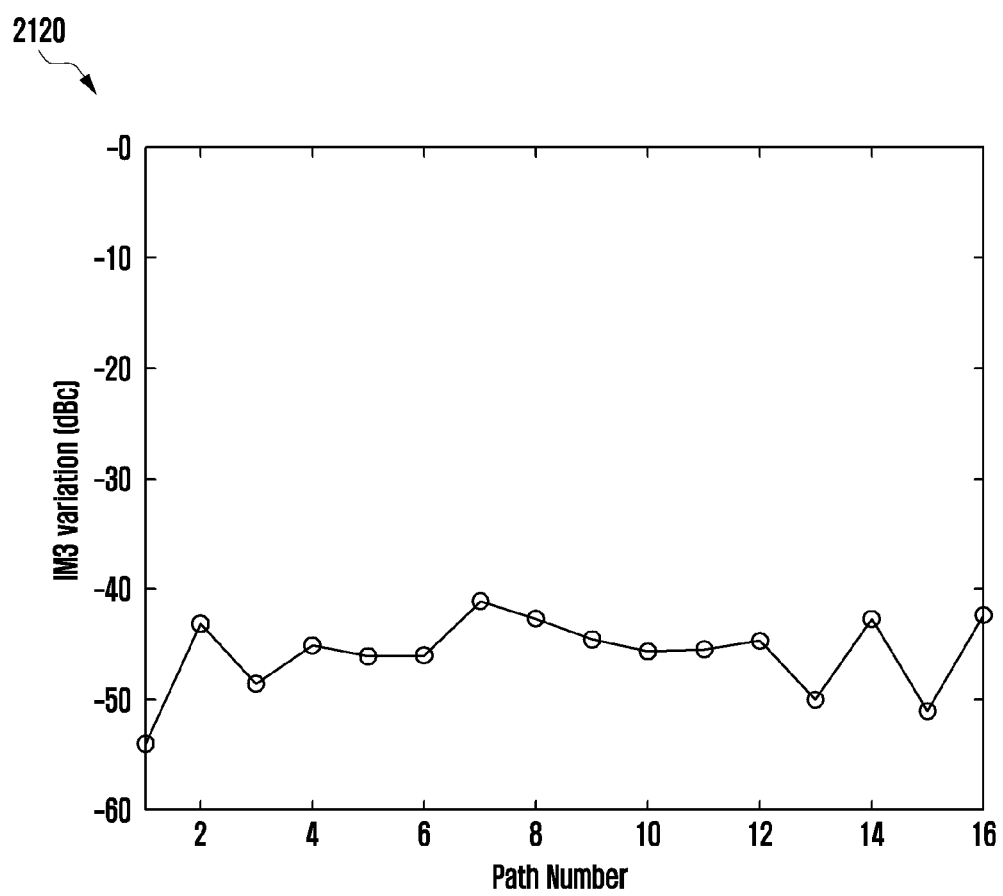

FIGS. 21A and 21B are graphs illustrating a calibration result using a measuring instrument and a calibration result using a loopback signal in a transmission mode of a calibration device according to an embodiment of the disclosure.

Figure 22:
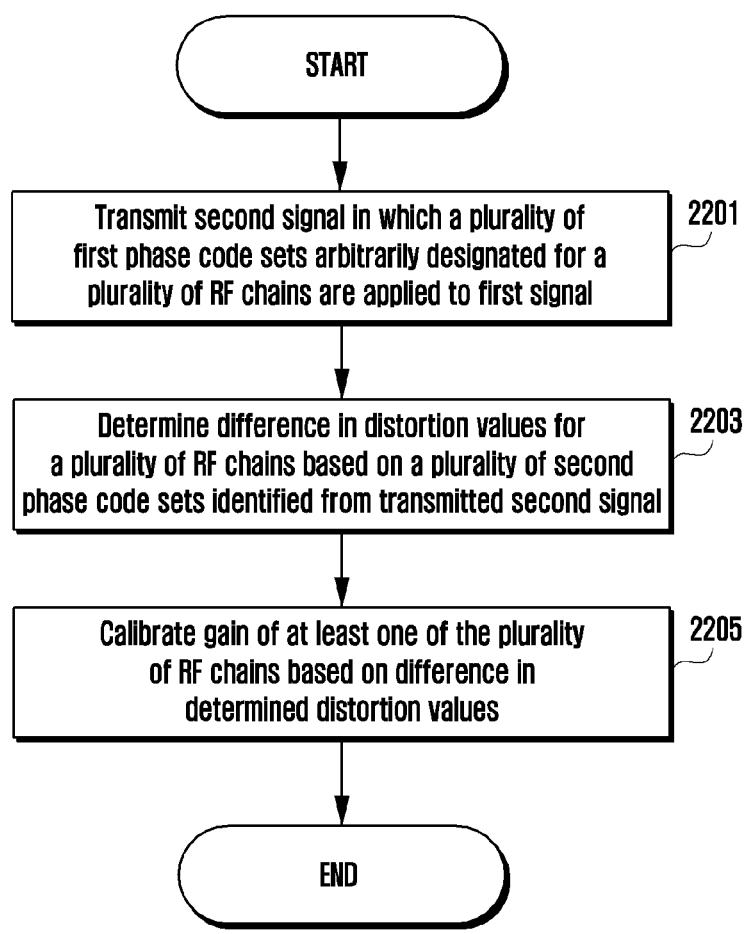
FIG. 22 is a flowchart illustrating an operation of a calibration device according to an embodiment of the disclosure.

FIG. 22 is a flowchart illustrating an operation of a calibration device according to an embodiment of the disclosure.

With reference to FIG. 22, in step 2201, the calibration device transmits a second signal in which a plurality of first phase code sets including phases arbitrarily designated for a plurality of RF chains are applied to the first signal.

Here, the first signal may be an initial input signal. In order to calibrate a plurality of RF chains included in the phased array antenna, the calibration device may configure an arbitrary phase value among known phase values, and apply and transmit the phase value to the first signal.

According to an embodiment, the N number of linear equations are required to calibrate the N number of RF chains. For example, for each of the N number of RF chains, the N number of phase code sets are generated by selecting an arbitrary value among known phase values, and by applying each of the N number of generated phase code sets to the first signal, the N number of different transmitting signals may be transmitted.

That is, the second signal may include the N number of different transmitting signals, and be a test signal transmitted from the phased array antenna.

In step 2203, the calibration device determines a difference in distortion values for a plurality of RF chains based on a plurality of second phase code sets identified from the transmitted second signal. The distortion value may mean the magnitude of distorted signals. A difference in distortion values may mean a difference in magnitudes of distorted signals. When two or more signals of different frequencies are input to the transmitter, intermodulation distortion may occur for the signals. The calibration device may measure intermodulation distortion with respect to the signals. For example, FIG. 21A illustrates an output signal 2110 when four signals of different frequencies (tone 1 to tone 4) are input to a transmitter. A signal distorted according to third-order intermodulation of a first frequency signal (tone 1) and a second frequency signal (tone 2) may correspond to a low frequency signal IMD 1 and a high frequency signal IMD 2. For example, the magnitude of the signal distorted according to the third-order intermodulation may be proportional to the magnitude of the output signal. For example, when output values of the first frequency signal (tone 1) and the second frequency signal (tone 2) increase by 1 dB, the magnitude of the signal distorted according to third-order intermodulation may increase by 3 dB. When the output values of the first frequency signal (tone 1) and the second frequency signal (tone 2) decrease by 1 dB, the magnitude of the signal distorted according to the third-order intermodulation may decrease by 3 dB.

The distortion may occur according to gain expansion or gain compression of the amplifier. For example, when the first frequency signal (tone 1) and the second frequency signal (tone 2) are in phase, a phase of the low frequency signal (IMD 1) and a phase of the high frequency signal (IMD 2) may mutually have a certain relationship. For example, in case of gain expansion of the amplifier, the phase of the low frequency signal IMD 1 and the phase of the high frequency signal IMD 2 may be in phase. In case of gain compression of the amplifier, the phase of the low frequency signal IMD 1 and the phase of the high frequency signal IMD 2 may be out of phase.

For example, the phase shifter may convert and output four signals of different frequencies (tone 1 to tone 4) based on Equation 16. For example, gain changes with respect to four signals of different frequencies (tones 1 to 4) may be the same as or similar to the gain variation graph 930 of FIG. 9B.

For example, the phase shifter may output a low frequency signal IMD 1 and a high frequency signal IMD 2 based on Equation 16. For example, with reference to FIG. 21B, gain changes with respect to the low frequency signal IMD 1 and the high frequency signal IMD 2 may be the same as or similar to a third-order intermodulation distortion modulation graph 2120. Because the magnitude of the signal distorted according to the third-order intermodulation changes by 3 dB whenever the value of the output signal changes by 1 dB, by adjusting gains of the amplifiers 110-1-5 to 110-N–5, optimization of distortion may be performed.

In step 2205, the calibration device may calibrate a gain of at least one of the plurality of RF chains based on a difference in distortion values determined with respect to the N number of RF chains.

According to various embodiments of the disclosure, the calibration device or elements thereof may be elements of a device (hereinafter, wireless communication device) that performs wireless communication using a phased array antenna (e.g., the phased array antenna 100).

In other words, the calibration device may not be implemented separately from the wireless communication device, but may be implemented inside the wireless communication device. In this case, the wireless communication device may perform additional calibration, if necessary (e.g., when a temperature of an internal circuit of the wireless communication device changes) for the phased array antenna that has already been calibrated.

According to various embodiments of the disclosure, a wireless communication device may include at least one of an electronic device, a terminal, a 'user equipment (UE)', a 'mobile station', a 'subscriber station', a 'remote terminal', a 'wireless terminal', a 'user device', a 'base station', an 'access point (AP)', an 'eNodeB (eNB)', a '5th generation node (5G node)', a 'wireless point', a 'transmission/reception point (TRP)', or other terms having an equivalent technical meaning or may be configured as at least one thereof.

According to various embodiments of the disclosure, the phase shifter of the phased array antenna constituting the calibration device may be configured to convert a phase of an IF signal. In this case, the controller of the calibration device may control phase shifters of the phased array antenna to convert a phase of an initial input signal transferred from the transmitter into the IF band.

According to various embodiments of the disclosure, the phase shifter of the phased array antenna in the calibration device may be configured to transform a phase of an LO signal. In this case, the controller of the calibration device may control the phase shifters of the phased array antenna to provide the phase-converted LO signals to the mixer of each RF chain. Because the phase change with respect to the LO signal is reflected to the RF signal converted from the IF signal based on the phase-converted LO signal, the calibration device may control the phase transformers configured to convert the phase of the LO signal to resultantly convert a phase of the signal transmitted by each RF chain.

According to various embodiments of the disclosure, the phased array antenna of the calibration device may include a digital to analog converter (DAC). The DAC may perform beamforming on a digital signal by multiplying the digital signal by a beamforming weight, and convert the beamformed digital signals into analog signals. Here, the beamforming weights may be used for changing the magnitude and/or phase of a signal, and be referred to as a 'precoding matrix', a 'precoder', or the like. The calibration device may control the DAC associated with each RF chain so that a phase of an initial input signal is changed for each RF chain, and as a result, the calibration device may convert the phase of the signal transmitted by each RF chain.

In describing in detail embodiments of the disclosure, 3GPP will mainly focus on the communication standard configured by the standard, but the main gist of the disclosure is applicable to other communication systems having a similar technical background with slight modifications within the scope not significantly departing from the scope of the disclosure, which will be possible at the discretion of a person having skilled technical knowledge in the technical field of the disclosure.

INDUSTRIAL APPLICABILITY

The disclosure may be used in the electronics industry and the information and communications industry.

The invention claimed is:

1. A method for calibration of a phased array antenna, the method comprising:
   transmitting, by a phased array antenna including three or more RF chains, a test signal in which a plurality of first phase code sets including a phase arbitrarily designated for each of the three or more RF chains are applied to an initial input signal transmitted from the three or more RF chains, wherein the test signal is a combined signal of signals simultaneously outputted from the three or more RF chains;
   obtaining, by a reception antenna, the test signal;
   determining a phase difference of each of the three or more RF chains based on a plurality of second phase code sets measured corresponding to the plurality of first phase code sets from the obtained test signal; and
   calibrating a phase of at least some of the three or more RF chains based on the phase difference of each of the three or more RF chains.

2. The method of claim 1, wherein the plurality of first phase code sets are generated by the three or more RF chains.

3. The method of claim 1, wherein obtaining the test signal through a coupler connected to the three or more RF chains.

4. The method of claim 1, wherein determining a phase difference of each of the three or more RF chains based on the plurality of second phase code sets measured corresponding to the plurality of first phase code sets from the obtained test signal comprises determining a phase difference of each of the three or more RF chains based on linear equations generated by the plurality of first phase code sets or the plurality of second phase code sets.

5. The method of claim 1, wherein calibrating a phase of at least some of the three or more RF chains based on the phase difference of each of the three or more RF chains comprises:
   determining a phase control value of each of the three or more RF chains using a result of applying a square matrix in which a sum of each row converges to one constant to the phase difference; and
   applying the determined phase control value to each of the three or more RF chains.

6. The method of claim 5, wherein a square matrix in which the sum of each row converges to one constant is determined based on following equation, $$H_{P1} = 1 \quad \text{[Equation]}$$

$$H_{p2n} = \begin{bmatrix} H_{Pn} & H_{Pn} \cdot e^{j\frac{2}{\pi}} \\ H_{Pn} \cdot e^{j\frac{2}{\pi}} & H_{Pn} \end{bmatrix}$$

where 2n is determined by the three or more RF chains included in the phased array antenna.

7. The method of claim 1, wherein calibrating a phase of at least some of the three or more RF chains based on the phase difference of each of the three or more RF chains comprises:
   determining a phase control value in which a gain of the phased array antenna is maximized for each of the three or more RF chains; and
   applying the determined phase control value to each of the three or more RF chains.

8. A device for calibration of a phased array antenna, the device comprising:
   the phased array antenna including three or more RF chains for transmitting a signal; and
   a controller configured to generate a test signal in which a plurality of first phase code sets including a phase arbitrarily designated for each of the three or more RF chains are applied to an initial input signal transmitted from the three or more RF chains, to transmit the generated test signal through the three or more RF chains, to obtain the transmitted test signal, to determine a phase difference of each of the three or more RF chains based on a plurality of second phase code sets measured corresponding to the plurality of first phase code sets from the obtained test signal, and to calibrate a phase for at least some of the three or more RF chains based on the phase difference of each of the three or more RF chains, wherein the test signal is a combined signal of signals simultaneously outputted from the three or more RF chains.

9. The device of claim 8, wherein the controller is configured to generate the plurality of first phase code sets by the three or more RF chains.

10. The device of claim 8, wherein the controller is configured to receive the test signal through a coupler connected to the three or more RF chains.

11. A method for calibration of a phased array antenna, the method comprising:
transmitting a test signal in which a plurality of first phase code sets including a phase arbitrarily designated for each of three or more RF chains are applied to an initial input signal transmitted from the three or more RF chains, wherein the test signal is a combined signal of signals simultaneously outputted from the three or more RF chains;
obtaining the test signal;
determining a distortion difference of each of the three or more RF chains based on a plurality of second phase code sets measured corresponding to the plurality of first phase code sets from the obtained test signal; and
calibrating a gain of at least some of the three or more RF chains based on the distortion difference of each of the three or more RF chains.

\* \* \* \* \*